United States Patent
Deguchi et al.

(10) Patent No.: US 11,762,574 B2
(45) Date of Patent: *Sep. 19, 2023

(54) BACKUP SYSTEM AND METHOD

(71) Applicant: Hitachi, Ltd., Tokyo (JP)

(72) Inventors: Akira Deguchi, Tokyo (JP); Kazuki Matsugami, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/943,613

(22) Filed: Sep. 13, 2022

(65) Prior Publication Data

US 2023/0008688 A1 Jan. 12, 2023

Related U.S. Application Data

(63) Continuation of application No. 17/478,984, filed on Sep. 20, 2021, now Pat. No. 11,449,263.

(30) Foreign Application Priority Data

Jul. 12, 2021 (JP) .................. 2021-115305

(51) Int. Cl.
G06F 3/06 (2006.01)
(52) U.S. Cl.
CPC .......... *G06F 3/065* (2013.01); *G06F 3/0619* (2013.01); *G06F 3/0641* (2013.01); *G06F 3/0644* (2013.01)
(58) Field of Classification Search
None
See application file for complete search history.

(56) References Cited

U.S. PATENT DOCUMENTS

| | | |
|---|---|---|
| 9,298,723 B1 | 3/2016 | Vincent |
| 10,564,850 B1 | 2/2020 | Gud |
| 2006/0277226 A1 | 12/2006 | Chikusa et al. |
| 2014/0351214 A1 | 11/2014 | Abercrombie et al. |
| 2018/0143994 A1 | 5/2018 | Ohtsuji |
| 2019/0108100 A1 | 4/2019 | Lyakas |
| 2019/0187925 A1 | 6/2019 | Urata |
| 2021/0072899 A1 | 3/2021 | Furuta |

FOREIGN PATENT DOCUMENTS

| | | |
|---|---|---|
| JP | 2006-338461 A | 12/2006 |
| JP | 2016-524220 A | 8/2016 |
| JP | 2020-112972 A | 7/2020 |
| WO | 2016185573 A1 | 11/2016 |
| WO | 2017/109822 A1 | 6/2017 |

OTHER PUBLICATIONS

Japanese Office Action received in corresponding Japanese Application No. 2021-115305 dated Jan. 17, 2023.

*Primary Examiner* — Jason W Blust
(74) *Attorney, Agent, or Firm* — MATTINGLY & MALUR, PC

(57) ABSTRACT

A backup-source storage system extracts, as a pattern, forwarding target data to a backup-destination storage system among data written to a storage apparatus through a volume. The backup-source storage system determines whether the extracted pattern matches with a registered pattern in the backup-source storage system. When a result of the determination is false, the backup-source storage system registers the extracted pattern and forwards the forwarding target data to the backup-destination storage system. When the result of the determination is true, the backup-source storage system does not forward the forwarding target data.

28 Claims, 25 Drawing Sheets

FIG. 4

PATTERN VOL TABLE
2210

| COPY DESTINATION STORAGE SYSTEM ID 501 | VOL NUMBER 502 |
|---|---|
| System1 | Vol1 |
| System2 | Vol2 |
| ... | ... |

PATTERN MANAGEMENT TABLE
2211A

| FP VALUE | VALIDATION FLAG | PATTERN ADDRESS |
|---|---|---|
| XXX | ON | 0 |
| YYY | ON | 512 |
| ZZZ | ON | 1024 |
| ... | ... | ... |

PATTERN VOL
26X

COMPARATIVE EXAMPLE 1

COMPARATIVE EXAMPLE 2

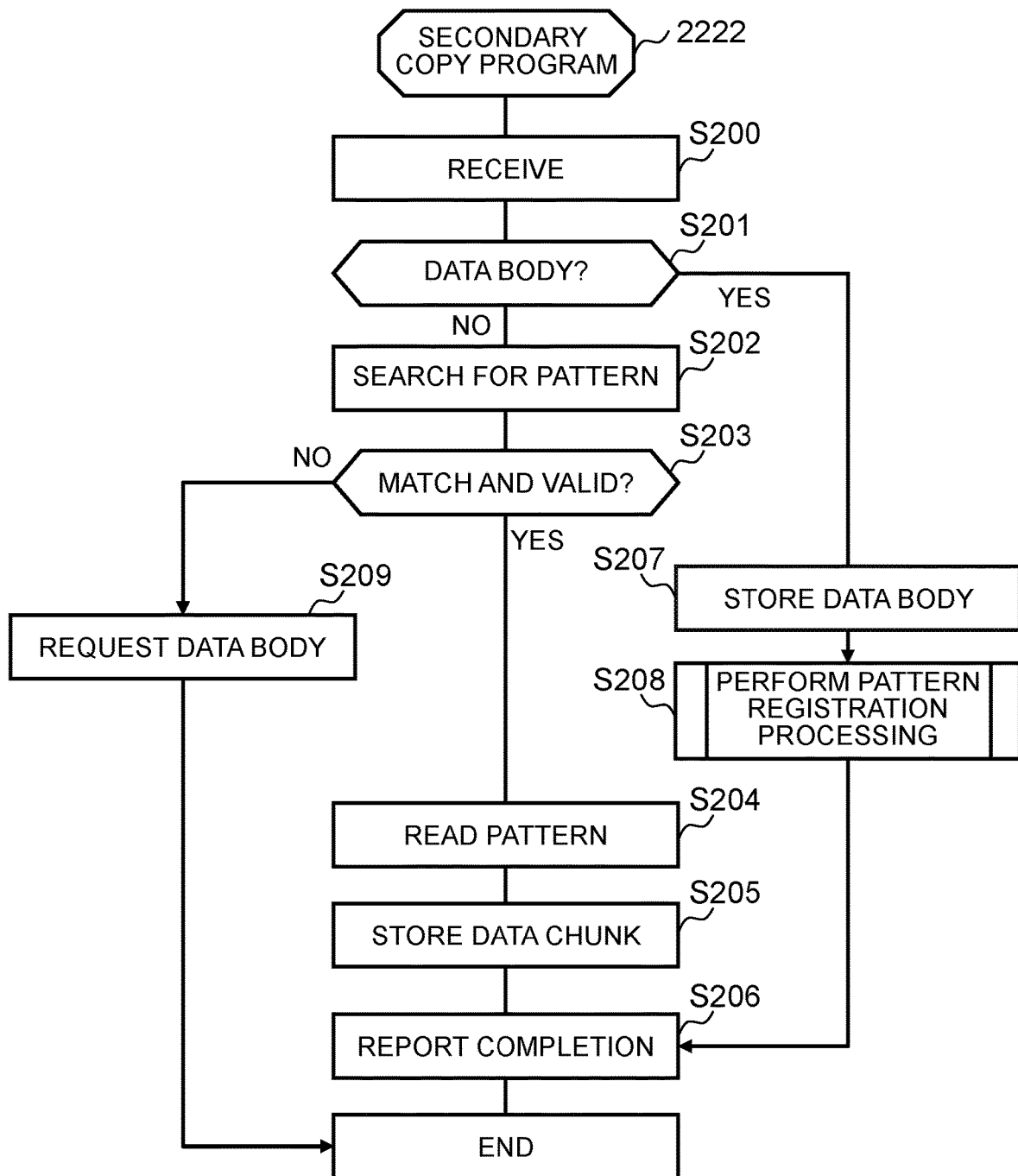

FIG. 15

PATTERN MANAGEMENT TABLE
2211B

| FP VALUE | THE NUMBER OF DUPLICATIONS | VALIDATION FLAG | PATTERN ADDRESS |
|---|---|---|---|
| XXX | 10 | ON | 0 |
| YYY | 10 | ON | 512 |
| ZZZ | 4 | ON | 1024 |
| ... | ... | ... | ... |

FIG. 21

SNAPSHOT MANAGEMENT TABLE
2215

| SNAPSHOT ACQUISITION TIME (2101) | CHUNK NUMBER (2102) | OBJECT KEY (2103) |
|---|---|---|
| 20201229-9:00 | 0 | Vol1-0000-20201229-900 |
| | 1 | Vol1-0001-20201229-900 |
| | ... | ... |
| | 1023 | Vol1-1023-20201229-900 |
| 20201230-9:00 | 20 | Vol1-0020-20201230-900 |
| | 215 | Vol1-0215-20201230-900 |
| | 897 | Vol1-0001-20201219-900 |
| ... | ... | ... |

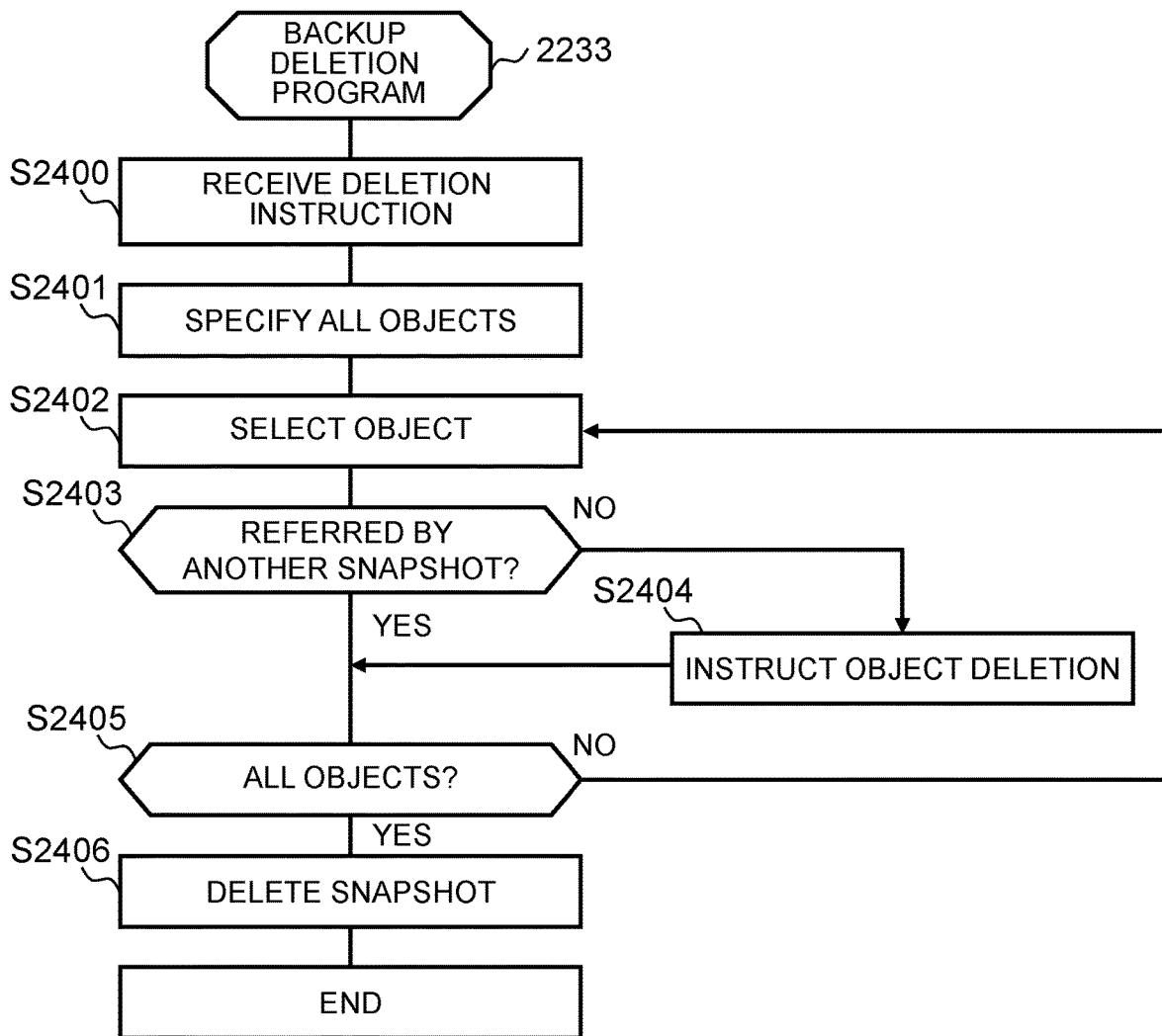

BACKUP SYSTEM AND METHOD

CROSS-REFERENCE TO PRIOR APPLICATION

This application relates to and claims the benefit of priority from Japanese Patent Application number 2021-115305, filed on Jul. 12, 2021 the entire disclosure of which is incorporated herein by reference.

BACKGROUND

The present invention generally relates to data backup between storage systems.

It is desirable to reduce the amount of forwarded data in data backup between storage systems. According to a technology disclosed in Patent Literature 1, a backup server checks a duplication relation of backup target data in a first storage and avoids a plurality of times of forwarding of duplicate data in the first storage to a second storage.
Patent Literature 1: WO2016/185573

SUMMARY

There is a case in which data is duplicate between a backup-source storage system and a backup-destination storage system in addition to or in place of a case in which data is duplicate in the backup-source storage system. Specifically, for example, any of the following cases occurs.

In addition to backup (that is performed inside or outside an apparatus) in a data center, backup to another data center prepared for disaster recovery is performed in some cases. When backup data in a data center is restored, all restored data is copied to another data center.

When a volume (VOL) pair of a VOL of a backup-source storage system and a VOL of a backup-destination storage system are configured again after accidentally deleted, data copy occurs between the VOLs again.

In such a case in which data is duplicate between a backup-source storage system and a backup-destination storage system, as well, it is desirable to avoid forwarding of duplicate data and reduce the amount of forwarded data.

A backup-source storage system including a volume and a first storage apparatus extracts, as a pattern, forwarding target data to a backup-destination storage system among data written to the first storage apparatus through the volume. The backup-source storage system determines whether the extracted pattern of the forwarding target data is registered in the backup-source storage system irrespective of a logical address of a storage-destination area of the forwarding target data in the backup-source storage system. When a result of the determination is false, the backup-source storage system registers the extracted pattern to the backup-source storage system and forwards the forwarding target data to the backup-destination storage system. When the result of the determination is true, the backup-source storage system does not forward the forwarding target data.

Forwarding of data between a backup-source storage system and a backup-destination storage system can be avoided, the data being duplicate between the storage systems.

BRIEF DESCRIPTION OF THE DRAWINGS

FIG. 4 illustrates an exemplary configuration of a pattern VOL table;
FIG. 10 illustrates the process of secondary copy processing performed by a secondary copy program in a secondary storage system;
FIG. 15 illustrates an exemplary configuration of a second pattern management table;
FIG. 21 illustrates an exemplary configuration of a snapshot management table;
FIG. 24 illustrates the process of backup deletion processing performed by the backup deletion program.

DESCRIPTION OF EMBODIMENTS

Figure 1:
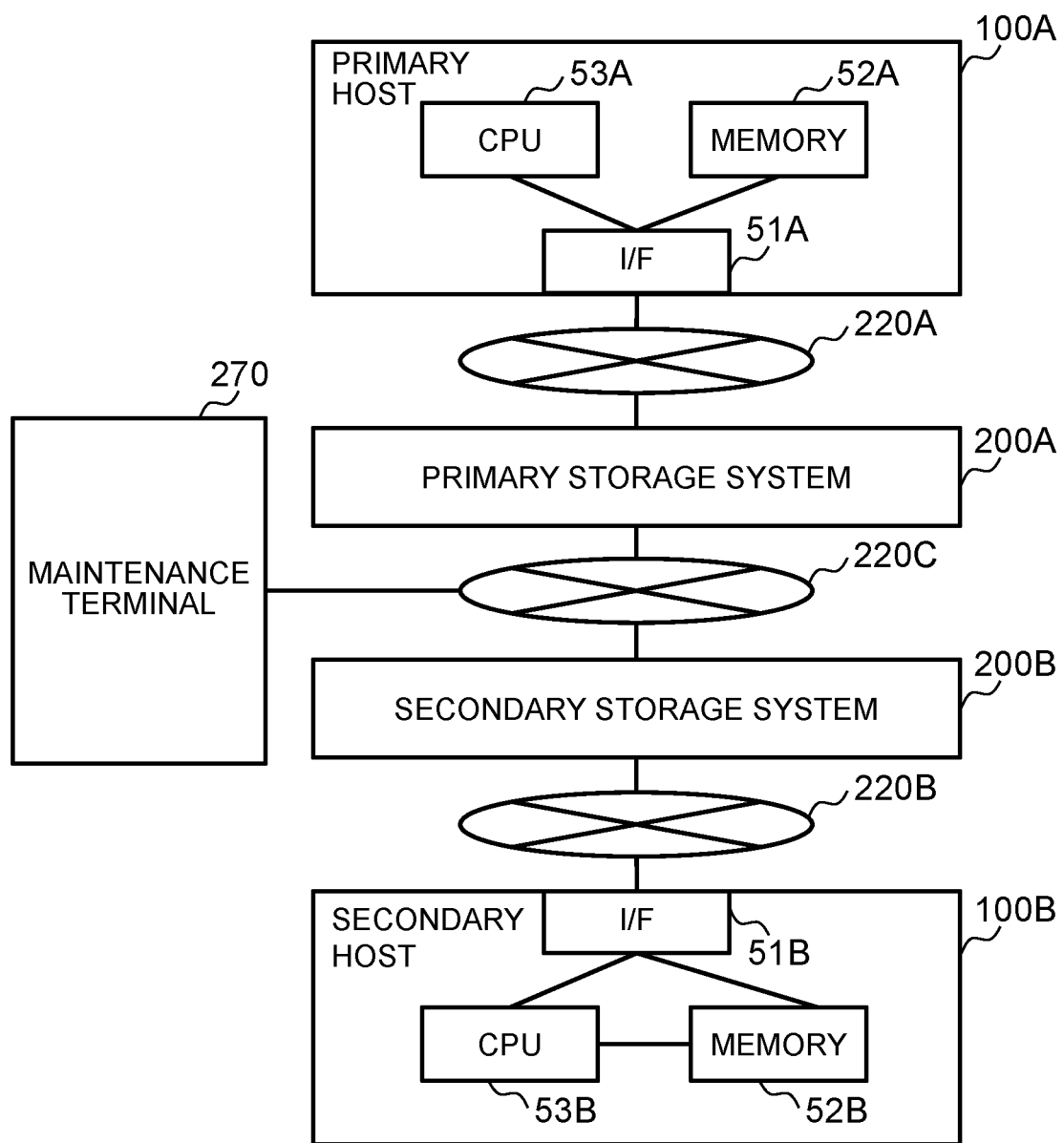
FIG. 1 illustrates an exemplary entire configuration of a system according to a first embodiment.

In the following description, an "interface apparatus" may be one or more interface devices. The one or more interface devices may be at least one of those listed below:
One or more input/output (I/O) interface devices. An input/output (I/O) interface device is an interface device for at least one of an I/O device and a remote display calculator. The I/O interface device for the display calculator may be a communication interface device. At least one I/O device may be any of user interface devices, for example, an input device such as a keyboard or a pointing device, or an output device such as a display device.

One or more communication interface devices. One or more communication interface devices may be one or more communication interface devices (for example, one or more network interface cards (NICs)) of the same kind or may be communication interface devices (for example, an NIC and a host bus adapter (HBA)) of two or more different kinds.

In the following description, a "memory" is one or more memory devices as examples of one or more storage devices and may be typically a main storage device. At least one memory device in the memory may be a volatile memory device or a non-volatile memory device.

In the following description, a "permanent storage apparatus" may be one or more permanent storage devices as examples of one or more storage devices. Each permanent storage device may be typically a non-volatile storage device (for example, an auxiliary storage device), and specifically, may be for example, a hard disk drive (HDD), a solid state drive (SSD), a non-volatile memory express (NVME) drive, or a storage class memory (SCM).

In the following description, a "storage apparatus" may be at least a memory among the memory and a permanent storage apparatus.

In the following description, a "processor" may be one or more processor devices. At least one processor device may be typically a microprocessor device such as a central processing unit (CPU) but may be a processor device of another kind such as a graphics processing unit (GPU). At least one processor device may have a single-core structure or a multi-core structure. At least one processor device may be a processor core. At least one processor device may be a processor device in a broad sense, such as a circuit (for example, a field-programmable gate array (FPGA), a complex programmable logic device (CPLD), or an application specific integrated circuit (ASIC)) as an assembly of gate arrays, which performs part or all of processing by a hardware description language.

In the following description, information from which an output can be obtained in response to an input is expressed as an "xxx table" in some cases, but the information may be data of any structure (for example, structured data or unstructured data) or may be a neural network, a genetic algorithm, or a learning model such as a random forest, which generate an output in response to an input. Thus, an "xxx table" may be referred to as "xxx information". In the following description, the configuration of each table is exemplary, and one table may be divided into two or more tables, or the entire or part of two or more tables may be one table.

In the following description, processing is described with a "computer program" as a subject in some cases, but the subject of the processing may be a processor (or an apparatus or a system that include the processor) because the computer program is executed by the processor when performing determined processing by using a storage apparatus and/or an interface apparatus as appropriate. The computer program may be installed on an apparatus such as a calculator from a computer program source. The computer program source may be, for example, a computer program distribution server or a calculator-readable recording medium (for example, a non-temporary recording medium). In the following description, two or more computer programs may be achieved as one computer program, and one computer program may be achieved as two or more computer programs.

A "volume" (VOL) is a logical storage area. The volume may be a real volume (RVOL) or a virtual volume (VVOL). The "RVOL" may be a VOL based on a storage apparatus, and the "VVOL" may be a volume compatible with a capacity virtualization technology (typically, thin provisioning).

A "storage system" may be a system including a plurality of storage devices and a controller configured to perform data I/O to and from the plurality of storage devices or may be a system including one or more physical calculators. In the latter system, for example, the one or more physical calculators may be each established as software-defined anything (SDx) by executing predetermined software. The SDx may be, for example, a software-defined storage (SDS) or a software-defined datacenter (SDDC).

In the following description, a sign common to reference signs of components of the same kind is used when the components are not distinguished from each other, but the reference signs are used when the components are distinguished from each other, in some cases.

Some embodiments will be described below.

First Embodiment

FIG. 1 illustrates an exemplary entire configuration of a system according to a first embodiment.

A primary host 100A is coupled to a primary storage system 200A through a network 220A (for example, a front-end network). A secondary host 100B is coupled to a secondary storage system 200B through a network 220B (for example, a front-end network). The primary storage system 200A and the secondary storage system 200B are coupled to each other through a network 220C (for example, a back-end network). Two or more of the networks 220A to 220C may be common, and at least one of the networks 220A to 220C may be a dedicated line.

A primary site (site including the primary host 100A and the primary storage system 200A) and a secondary site (site including the secondary host 100B and the secondary storage system 200B) may be geographically separated from each other. The primary host 100A is a calculator including an interface apparatus 51A, a memory 52A, and a central processing unit (CPU) 53A. The secondary host 100B is a calculator including an interface apparatus 51B, a memory 52B, and a CPU 53B. The primary host 100A may be a virtual apparatus (for example, a virtual machine (VM) or a container). Similarly, the secondary host 100B may be a virtual apparatus. The primary host 100A may be a virtual apparatus included in the primary storage system 200A, and similarly, the secondary host 100B may be a virtual apparatus included in the secondary storage system 200B (specifically, at least one of the storage systems 200A and 200B may be what is called a hyper-converged storage system). The secondary host 100B may be omitted. For example, when the distance between the storage systems 200A and 200B is short, the primary host 100A may be coupled to the secondary storage system 200B in addition to the primary storage system 200A. The secondary host 100B may be coupled to the primary storage system 200A in addition to the secondary storage system 200B. Both or one of the storage systems 200A and 200B may be a system installed in co-location or may be a system on a cloud that provides a cloud computing service (storage service).

The primary host 100A executes software (for example, a database management system (DBMS)) configured to execute task processing, and transmits a data write request to the primary storage system 200A. The primary storage system 200A stores data in accordance with the write request. Remote copy is performed between the storage systems 200A and 200B. Specifically, the secondary storage system 200B receives data from the primary storage system 200A and stores the received data. Disaster recovery is performed when failure occurs to the primary host 100A or the primary storage system 200A. Accordingly, the secondary host 100B can continue the task processing at the primary host 100A by using data in the secondary storage system 200B. A remote copy system is a system including the storage systems 200A and 200B.

A maintenance terminal 270 is coupled to the network 220C. The maintenance terminal 270 communicates with at least one of the storage systems 200A and 200B to perform maintenance or management of the storage system 200. The maintenance terminal 270 may be coupled to the network 220A and perform maintenance of the primary storage system 200A. Another maintenance terminal 270 may be coupled to the network 220B and perform maintenance of the storage system 200B.

The primary storage system 200A is an exemplary backup-source storage system. The secondary storage system 200B is an exemplary backup-destination storage system. One or a plurality of secondary storage systems 200B exist for one primary storage system 200A.

Figure 2:
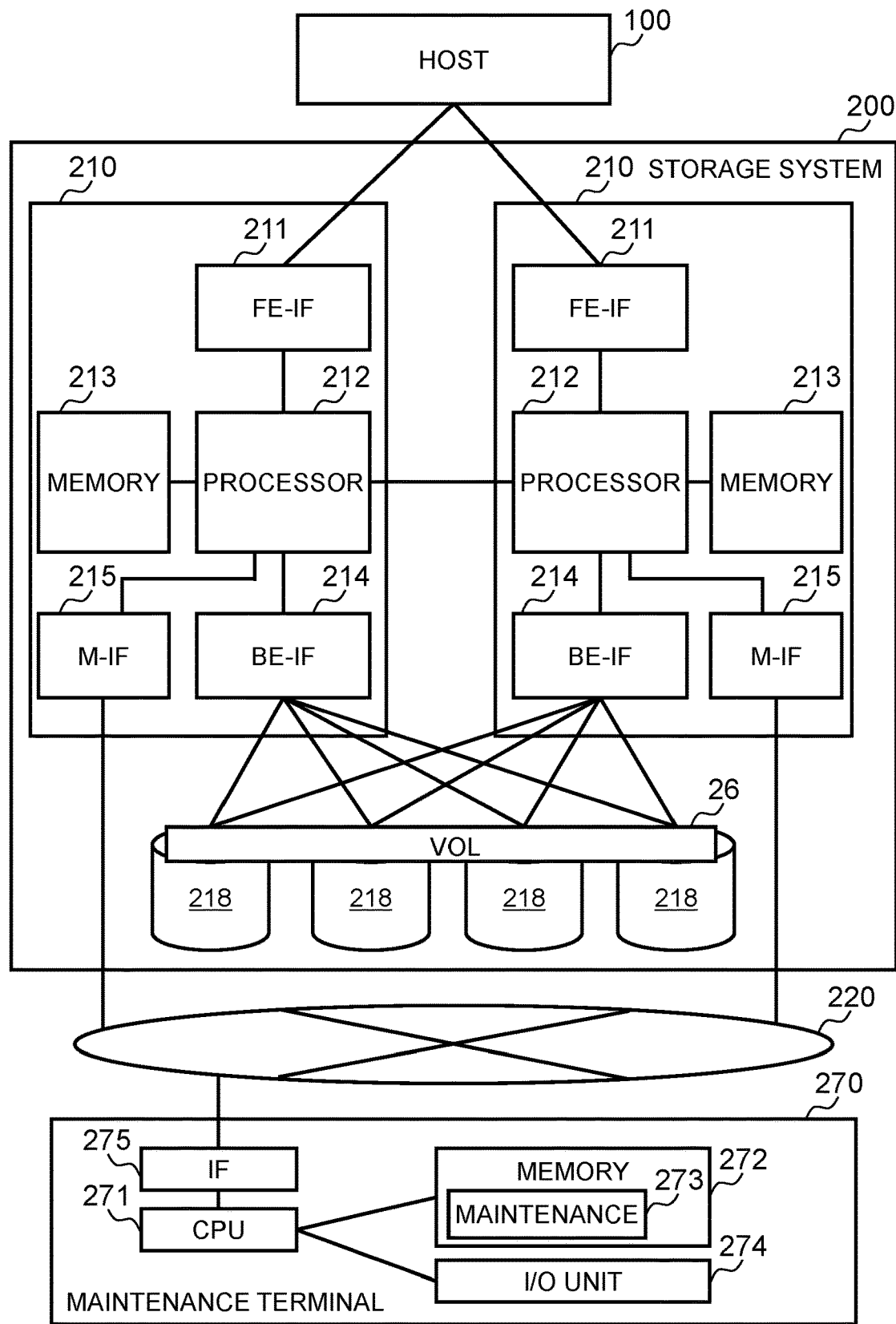
FIG. 2 illustrates an exemplary configuration of a storage system and a maintenance terminal.

FIG. 2 illustrates an exemplary configuration of each storage system 200 and the maintenance terminal 270.

The storage system 200 includes a drive group (a plurality of drives 218) and a redundant controller 210 configured to perform data I/O to and from the drive group. Each drive 218 is an exemplary permanent storage device. The drive group may have one or more redundant array of independent (or inexpensive) disks (RAID) groups. A volume (VOL) 26 is provided based on the drive group.

The controller 210 includes a front-end interface (FE-IF) 211, a back-end interface (BE-IF) 214, a management interface (M-IF) 215, a memory 213, and a processor 212 coupled thereto. The IFs 211, 214, and 215 are exemplary interface apparatuses.

The FE-IF 211 is an interface device configured to communicate with a host 100. The FE-IF 211 may include a plurality of ports (for example, a fibre channel port and an iSCSI port). A remote copy path (path through which forwarding target data passes) may be a path including a port of the FE-IF 211 of the primary storage system 200A and a port of the FE-IF 211 of the secondary storage system 200B. A remote copy interface device may be provided separately from the FE-IF 211.

The BE-IF 214 is an interface device configured to communicate with each drive 218.

The M-IF 215 is an interface device configured to communicate with the maintenance terminal 270. A port included in the M-IF 215 may be included in a remote copy path in place of a port included in the FE-IF 211.

The memory 213 stores computer programs and data. The memory 213 may include, for example, a cache memory area in which data is temporarily stored. The computer programs stored in the memory 213 are executed by the processor 212.

The maintenance terminal 270 is a calculator including an IF 275, an I/O unit 274, a memory 272, and a CPU 271 coupled thereto. The IF 275 is an interface device including a port coupled to a network 220. The I/O unit 274 is a user interface device such as a keyboard, a pointing device, or a display device. The memory 272 stores computer programs (for example, a maintenance program 273) and data. The CPU 271 performs maintenance of the storage system 200 by executing the maintenance program 273. For example, the CPU 271 executing the maintenance program 273 may receive information (for example, information indicating the distance between the storage systems 200A and 200B or information indicating necessary multiplicity) from a user through the I/O unit 274 and may set the received information to the storage system 200 through the IF 275.

Figure 3:
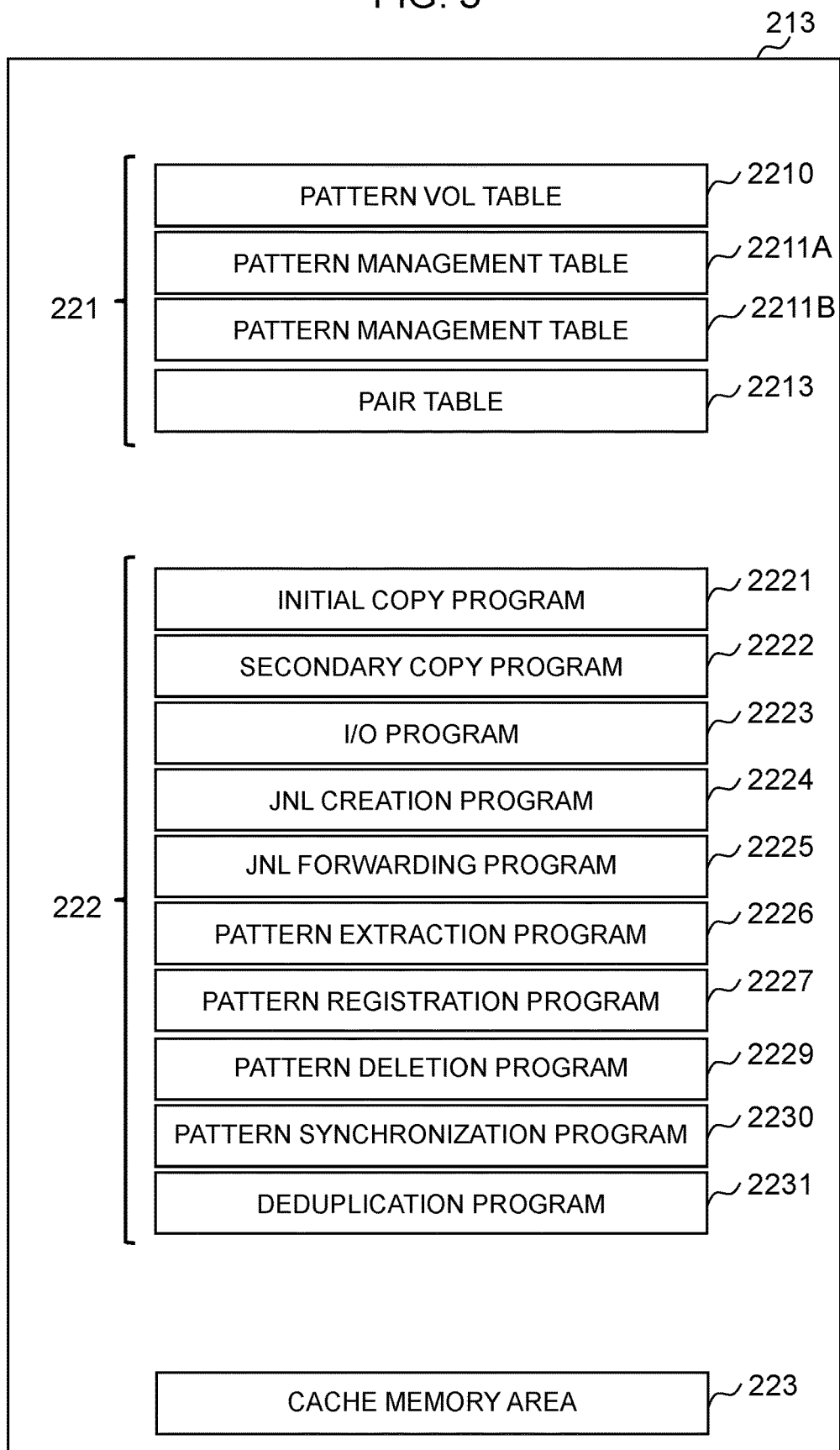
FIG. 3 illustrates an exemplary configuration of a memory of the storage system.

FIG. 3 illustrates an exemplary configuration of the memory 213.

The memory 213 includes a management area 221, a computer program area 222, and a cache memory area 223.

Management information is stored in the management area 221. The management information includes a pattern VOL table 2210, a pattern management table 2211A and/or a pattern management table 2211B, and a pair table 2213. The tables 2210 and 2211 will be described later. The pair table 2213 is a table that manages the relation between a copy source and a copy destination of remote copy. The pair table 2213 includes, for each VOL pair, the ID of a primary volume (PVOL), the ID of a secondary volume (SVOL), and the ID of a storage system 200 at a copy destination. The pair table 2213 may also manage a pair state or the like for managing, for example, a temporary stop state, a normal state, and an anomalous sate of copy processing. Any of the tables does not necessarily need to be provided, depending on a function unnecessary for the own storage system 200. Another table may be provided in place of or in addition to any of the tables. Any table needed for typical remote copy processing, deduplication processing, and data storage processing is not illustrated. Examples of such tables include a mapping table that associates a sequence number to be allocated to a journal to be described later, a logical address, and a physical address, and a management table of storage capacity of a volume or a system, and the like.

Computer programs are stored in the computer program area 222. Examples of the stored computer programs include an initial copy program 2221 for performing initial copy of data in a PVOL, a secondary copy program 2222 for performing storage of forwarded data, an I/O program 2223 for performing data I/O to and from a PVOL (or SVOL) in response to an I/O request from a host, a journal (JNL) creation program 2224 for creating a JNL, a JNL forwarding program 2225 for forwarding a JNL, a pattern extraction program 2226 for extracting a pattern, a pattern registration program 2227 for registering a pattern, a pattern deletion program 2229 for deleting a pattern, a pattern synchronization program 2230 for synchronizing a pattern, and a deduplication program 2231 for performing deduplication. Any of the computer programs does not necessarily need to be provided, depending on a function unnecessary for the storage system 200. Another computer program may be provided in place of or in addition to any of the computer programs.

The cache memory area 223 temporarily stores data (typically, data input to and output from the drives 218).

The storage system 200 including the memory 213 can function as one or both of the primary storage system 200A and the secondary storage system 200B. For example, the storage system 200 functions as the primary storage system 200A when the storage system 200 includes a PVOL but does not include a SVOL (copy-destination VOL that forms a VOL pair together with the PVOL). The storage system 200 functions as the secondary storage system 200B when the storage system 200 does not include a PVOL but includes a SVOL. The storage system 200 functions as the primary storage system 200A and the secondary storage system 200B when the storage system 200 includes a SVOL in a first VOL pair and includes a PVOL in a second VOL pair.

In the present embodiment, backup is, for example, synchronous remote copy and/or asynchronous remote copy. In the synchronous remote copy, a response to a write request is returned when remote copy of write target data accompanying the write request is performed. In the asynchronous remote copy, a response to a write request is returned irrespective of whether remote copy of write target data accompanying the write request is performed.

FIG. 4 illustrates an exemplary configuration of the pattern VOL table 2210.

A backup-destination storage system already has data and manages, as a pattern, a data candidate, forwarding of which to a backup-destination storage can be avoided. The backup-destination storage system is also referred to as a copy-destination storage system.

The pattern VOL table 2210 includes, for each copy-destination storage system of the storage system 200, information such as a copy-destination storage system ID 501 and a VOL number 502. The copy-destination storage system ID 501 indicates the ID of the copy-destination storage system. The VOL number 502 indicates the identification number of a pattern VOL. The identification number of a VOL is the identification number of the VOL in a storage system including the pattern VOL table 2210. Specifically, the VOL number 502 in the pattern VOL table 2210 of a copy-source storage system is the identification number of a pattern VOL included in the copy-source storage system. In the present embodiment, an ID and an identification number are exemplary identification information. Although the example in which management is performed for each copy-destination storage system is described, a pattern VOL may be provided for each part of the copy-destination storage system. For example, a pattern VOL may be provided for each logic division unit or each capacity pool.

A "pattern VOL" is a VOL in which a pattern is stored, and is an offline VOL that is not specified by an I/O request (VOL that is not provided to a host). A "pattern" is data forwarded from the primary storage system 200A to the secondary storage system 200B. "Forwarded data" is typically uncompressed data read from a VOL but may be any data, the contents of which can be specified. Although a pattern is typically forwarded data, the pattern may be data held in a copy-destination storage. For example, data in which all bits are "0" and data in which all bits are "1" may be managed as patterns by a copy source and a copy destination in advance.

Data already forwarded to a first secondary storage system 200B does not need to be forwarded to the first secondary storage system 200B again, but when the same data is copy target data yet to be forwarded to a second secondary storage system 200B, the data needs to be forwarded to the second secondary storage system 200B. Thus, in the present embodiment, when a primary storage system 200A is coupled to a plurality of secondary storage systems 200B, the primary storage system 200A manages a pattern VOL (in other words, registered pattern) for each of the plurality of secondary storage systems 200B as exemplarily illustrated in FIG. 4. Accordingly, it is possible to determine which data needs to be forwarded or not to be forwarded to which secondary storage system 200B. A pattern VOL is an exemplary logical storage area. When the logical storage area is an area in the memory 213, information indicating an address in the memory 213 may be employed in place of the VOL number 502.

Figures 5, 6:
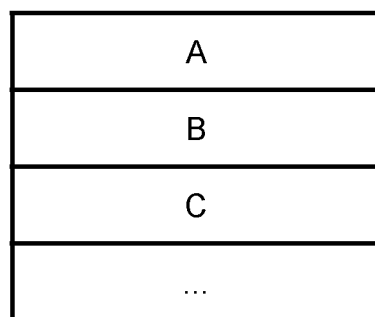
FIG. 5 illustrates an exemplary configuration of a first pattern management table.
FIG. 6 illustrates an exemplary pattern VOL.

FIG. 5 illustrates an exemplary configuration of the pattern management table 2211A.

The pattern management table 2211A includes, for each pattern, information such as a fingerprint value 601, a validation flag 602, and a pattern address 603.

The fingerprint value 601 is a fingerprint value of a pattern and is, for example, a hash value. The fingerprint value is exemplary identification information and may be any other identification information. The fingerprint value does not need to be identification information generated from data. The validation flag 602 indicates whether the pattern is valid or invalid (for example, the validation flag 602 of the pattern is set to "OFF" (invalid) at a timing such as when the pattern is being registered). The pattern address 603 indicates the address of a storage-destination area of the pattern (the address of an area in a pattern VOL).

The pattern management table 2211A may exist for each secondary storage system 200B, or may be common to a plurality of secondary storage systems 200B and record, for each pattern, the ID of any secondary storage system 200B that is already set to be a forwarding destination. The pattern management table 2211A may be stored in a pattern VOL to which the table 2211A corresponds in place of or in addition to storage in the memory 213. The pattern address 603 is not necessarily needed. For example, when an address in a pattern VOL is fixedly associated with a record in the table, it is possible to specify an address in which pattern data is stored.

FIG. 6 illustrates an exemplary pattern VOL 26X in which the body of data as a pattern is stored.

The pattern VOL 26X (and each PVOL and each SVOL) includes a plurality of continuous chunk areas. A "chunk area" is a logical area of a chunk size in which a data chunk is stored, and is an exemplary logical area of a predetermined size in a VOL. The "data chunk" is exemplary data of a predetermined size. The "chunk size" is, for example, the unit size (for example, 4 KB) of deduplication. A pattern of the chunk size (in other words, a pattern as the data chunk) is written to the pattern VOL 26X. In the example illustrated in FIG. 6, patterns A, B, and C are stored in the pattern VOL 26X.

A "pattern VOL" is an exemplary logical storage area as described above. The logical storage area may be provided in the memory 213.

Figure 7A:
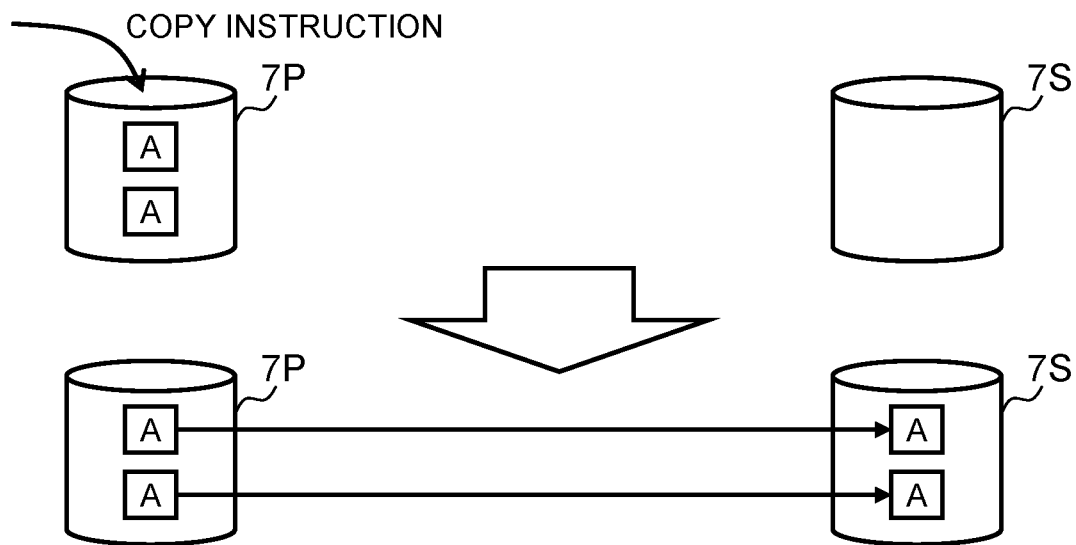
FIG. 7A illustrates an overview of Comparative Example 1 of the embodiment.

FIG. 7A illustrates an overview of Comparative Example 1 of the embodiment.

A primary storage system includes a PVOL 7P, and a secondary storage system includes a SVOL 7S that forms a VOL pair together with the PVOL 7P. Two copies of a data chunk A exist in the PVOL 7P. In other words, the data chunk A is duplicate in the PVOL 7P.

Thus, when a copy instruction is issued for the PVOL 7P, the data chunk A is forwarded twice from the primary storage system to the secondary storage system.

Figure 7B:
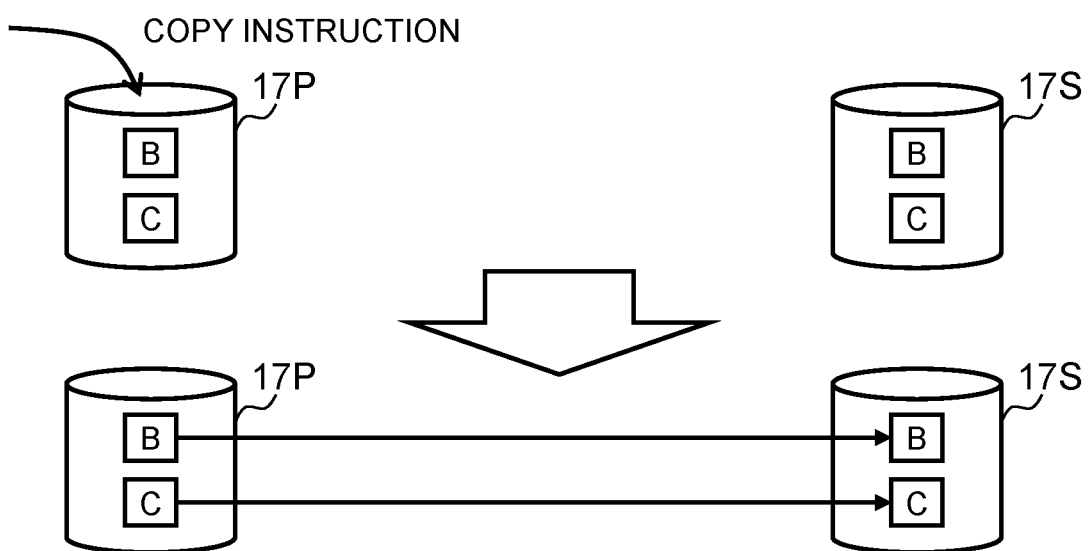
FIG. 7B illustrates an overview of Comparative Example 2 of the embodiment.

FIG. 7B illustrates an overview of Comparative Example 2 of the embodiment.

A primary storage system includes a PVOL 17P, and a secondary storage system includes a SVOL 17S that forms a VOL pair together with the PVOL 17P. Data chunks B and C exist in each of the PVOL 17P and the SVOL 17S. In other words, data chunks B and C are each duplicate between the PVOL 17P and the SVOL 17S.

Thus, when a copy instruction is issued for the PVOL 17P, data chunks B and C are forwarded from the primary storage system to the secondary storage system although data chunks B and C exist in the SVOL 17S.

Figure 8:
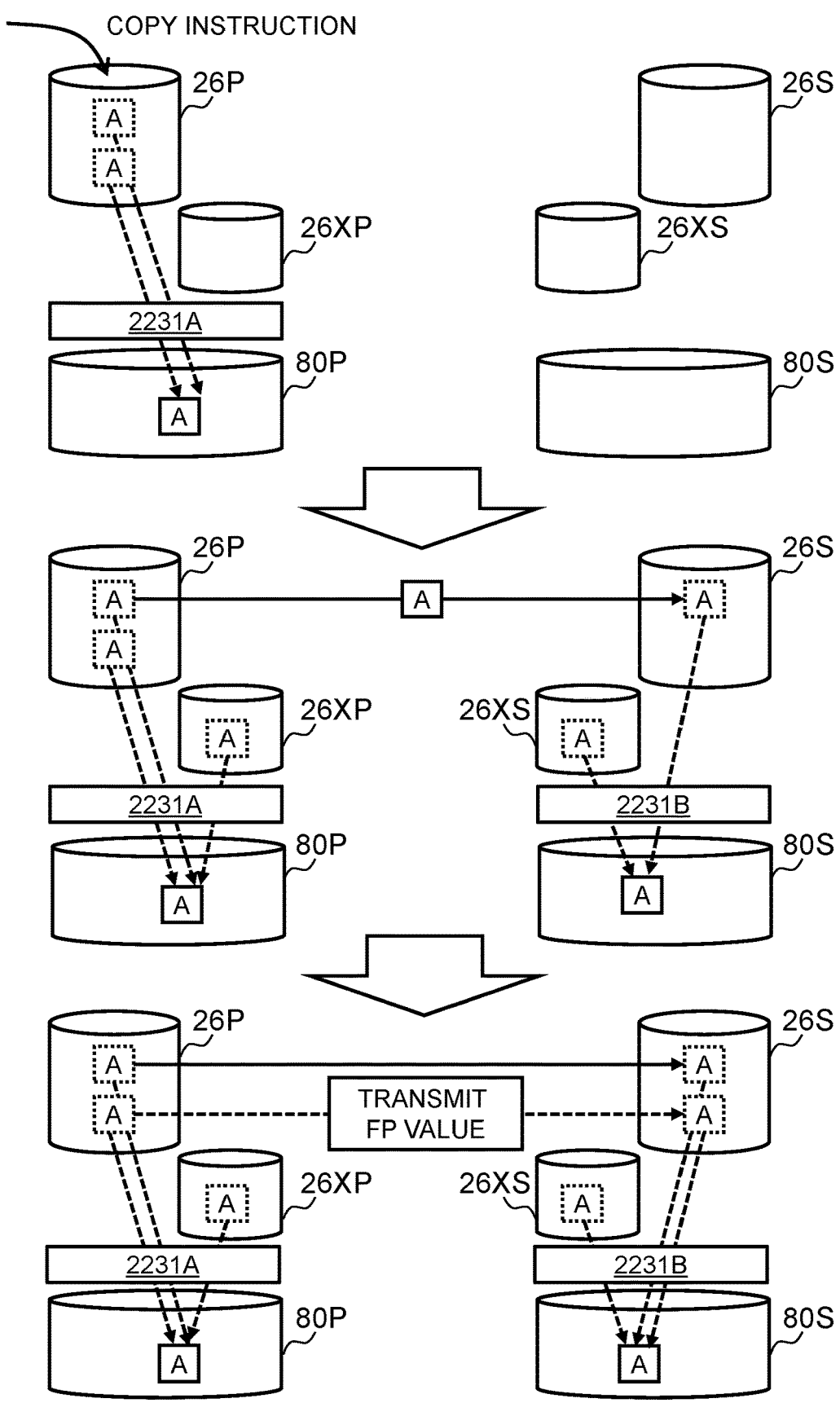
FIG. 8 illustrates an overview of the first embodiment.

FIG. 8 illustrates an overview of the present embodiment.

The primary storage system 200A includes a PVOL 26P, a pattern VOL 26XP, and a storage area (hereinafter referred to as physical storage area) 80P based on a drive group (exemplary first storage apparatus). The secondary storage system 200B includes a SVOL 26S that forms a VOL pair together with the PVOL 26P, a pattern VOL 26XS, and a physical storage area 80S based on a drive group (exemplary second storage apparatus). The physical storage areas 80P and 80S may be each, for example, a capacity pool including one or more VOLs. Data is written to the physical storage area 80P through the PVOL 26P, and data is written to the physical storage area 80S through the SVOL 26S. In addition, remote copy is applied to the PVOL 26P and the SVOL 26S, and the PVOL 26P and the SVOL 26S form a VOL pair.

The primary storage system 200A includes a deduplication program 2231A, and the secondary storage system 200B includes a deduplication program 2231B. The deduplication program 2231A performs deduplication by associating (pointing) a plurality of chunk areas in which the same data is stored in one or a plurality of VOLs 26 with (to) one physical area (area in a physical storage area 80) in which the data exists. In the example illustrated in FIG. 8, in the primary storage system 200A, the deduplication program 2231A associates two chunk areas in which data A is stored in the PVOL 26P with one physical area in which the data A exists. Data stored in a chunk is also referred to as a data chunk.

Assume that a copy instruction (for example, initial copy instruction) is issued for the PVOL 26P and a data chunk A in the PVOL 26P is a forwarding target to the secondary storage system 200B (to be copied to the SVOL 26S). The primary storage system 200A extracts the forwarding target data chunk A as a pattern A and determines whether the extracted pattern A is registered in the pattern VOL 26XP. Since the pattern A is not registered in this example, the result of the determination is false. In this case, the primary storage system 200A registers the extracted pattern A to the pattern VOL 26XP and forwards the forwarding target data chunk A to the secondary storage system 200B. In this manner, the data chunk forwarded to the secondary storage system 200B once is registered to the pattern VOL 26XP as a pattern. When having received the data chunk A from the primary storage system 200A, the secondary storage system 200B extracts the data chunk A as the pattern A, registers the pattern A to the pattern VOL 26XS, and stores the data chunk A in the SVOL 26S (stores the data chunk A in the physical storage area 80S through the SVOL 26S). The registration of the pattern A in the primary storage system 200A may include correspondence between the address of a storage-destination area of the data chunk A as the pattern A and the address of a registration-destination area (for example, an area in the pattern VOL 26XP) of the pattern A. Similarly, the registration of the pattern A in the secondary storage system 200B may include correspondence between the address of a storage-destination area of the data chunk A as the pattern A and the logical address of a registration-destination area (for example, an area in the pattern VOL 26XS) of the pattern A. A "storage-destination area" in this paragraph may be a physical area in the physical storage area 80 or may be a logical area in a logical volume.

Assume that, thereafter, the data chunk A stored in another chunk in the PVOL 26P is set as a forwarding target to the secondary storage system 200B again. The primary storage system 200A extracts the data chunk A as the pattern A, but the pattern A is registered in the pattern VOL 26XP. Thus, the result of the above-described determination is true. In this case, the primary storage system 200A does not forward the forwarding target data chunk A. Accordingly, forwarding of the data A between the storage systems 200A and 200B can be avoided, the data A being duplicate between the storage systems 200A and 200B.

Specifically, the primary storage system 200A transmits a fingerprint value (FP value) of the pattern A to the secondary storage system 200B in place of the forwarding target data chunk A. In this manner, remote copy can be achieved by forwarding the fingerprint value, which has a data size smaller than that of the data chunk A, in place of the data chunk A.

When having received the fingerprint value from the primary storage system 200A, the secondary storage system 200B specifies the pattern A in the pattern VOL 26XS based on the fingerprint value, reads the data A from the pattern VOL 26XS, and writes the read data A to a copy-destination area in the SVOL 26S. Alternatively, the secondary storage system 200B associates a chunk area (copy-destination area of remote copy) in the SVOL 26S with a physical area (physical area in the physical storage area 80S) in which the data chunk A exists. In this manner, it is possible to avoid forwarding of the data body from the pattern VOL 26XS to the SVOL 26S in the secondary storage system. Accordingly, the data A is copied to the SVOL 26S although the data chunk A is not forwarded.

The data chunk A written to the physical storage area 80P through the PVOL 26P and the pattern A registered to the pattern VOL 26XP are duplicate in the primary storage system 200A. Thus, the registration of the pattern A is such that the deduplication program 2231A associates a registration-destination chunk area (chunk area in the pattern VOL 26XP) of the pattern A with a physical area (physical area in the physical storage area 80P) in which the data chunk A written to the physical storage area 80P through the PVOL 26P exists. Thus, a registered pattern in the pattern VOL 26XP is a data chunk existing in a physical area associated with a registration-destination chunk area of the pattern. Accordingly, a pattern is registered each time a data chunk not registered as a pattern is forwarded, but consumption of storage capacity of the physical storage area 80P can be avoided despite the pattern registration. In other words, data deduplication is achieved in the PVOL 26P and the pattern VOL 26XP.

Similarly, it is possible to achieve, in the secondary storage system 200B as well, deduplication of the data chunk A written to the physical storage area 80S through the SVOL 26S and the pattern A registered to the pattern VOL 26XS. Specifically, deduplication is achieved by the deduplication program 2231B associating a registration-destination chunk area (chunk area in the pattern VOL 26XS) of the pattern A with a physical area (physical area in the physical storage area 80S) in which the data chunk A exists.

Figure 9A:
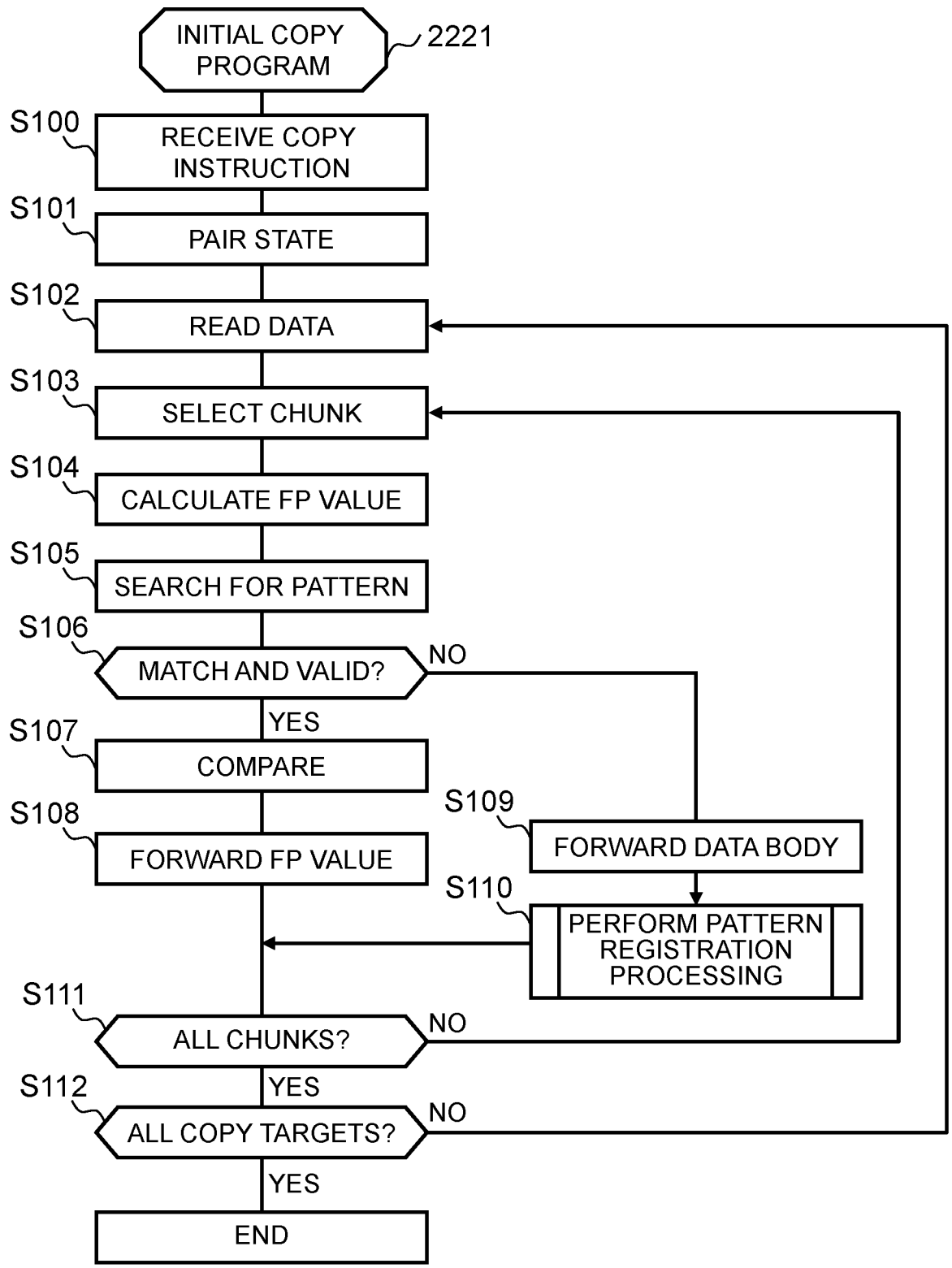
FIG. 9A illustrates the process of initial copy processing performed by an initial copy program in a primary storage system.

FIG. 9A illustrates the process of initial copy processing performed by the initial copy program 2221 in the primary storage system 200A. "Initial copy" is copy of all data in the PVOL 26P to the SVOL 26S. The processing illustrated in FIG. 9A may be processing common to synchronous remote copy and asynchronous remote copy.

The initial copy program 2221 receives a copy instruction for the PVOL 26P (S100) and sets, to the pair table 2213, an entry including a predetermined pair state of the VOL pair of the PVOL 26P and the SVOL 26S, the ID of the PVOL, the ID of the SVOL, and the ID of a copy-destination storage system (S101). At S101, a secondary storage system 200B including the copy-destination SVOL 26S is specified, and accordingly, a pattern VOL 26XP corresponding to the secondary storage system 200B is specified in the pattern VOL table 2210, and a pattern management table 2211A corresponding to the secondary storage system 200B is specified. When there is no pattern VOL 26XP corresponding to the specified secondary storage system 200B or no entry in the pattern VOL table 2210, they are newly created.

The initial copy program 2221 reads data that is a copy target in the initial copy processing but yet to be read from the PVOL 26P, and divides the read data into one or more data chunks (S102).

The initial copy program 2221 selects one data chunk yet to be selected among the one or more data chunks obtained at S102 (S103) and calculates a fingerprint value of the selected data chunk (S104). The initial copy program 2221 searches the pattern management table 2211A for a fingerprint value 601 that matches with the fingerprint value calculated at S104 (S105). The initial copy program 2221 determines whether there is the matching fingerprint value 601 as a result of S105 and a validation flag 602 corresponding to the fingerprint value 601 is "ON" (S106).

When the result of the determination at S106 is false (NO at S106), the initial copy program 2221 forwards a copy request associated with the data body to the secondary storage system 200B (S109) and causes the pattern registration program 2227 in the primary storage system 200A to execute pattern registration processing (S110). The "data body" is the entire data chunk or part thereof (to be described later in detail). The pattern synchronization program 2230 may be executed right after S110.

When the result of the determination at S106 is true (YES at S106), the initial copy program 2221 reads a pattern from a logical area (area in the pattern VOL 26XP) indicated by a pattern address 603 corresponding to the matching fingerprint value 601, and checks that the pattern matches with the data chunk selected at S103 through comparison (S107). Thereafter, the initial copy program 2221 forwards a copy request associated with the matching fingerprint value to the secondary storage system 200B (S108). In this manner, when there is a matching pattern, a forwarding target is a fingerprint value having a size smaller than that of a data chunk, and thus the amount of forwarded data can be reduced. The copy request may include various kinds of stored information in typical remote copy processing. The information is, for example, the storage address of forwarding target data in a PVOL or a SVOL. A data chunk and a pattern are compared at S107 but do not necessarily need to be compared. The data chunk and the pattern may be determined to be identical, for example, when their hash values are identical.

After S108 or S110, the initial copy program 2221 determines whether the one or more data chunks obtained at S102 are all selected at S103 (S111). When the result of the determination at S111 is false (NO at S111), the processing returns to S103.

When the result of the determination at S111 is true (YES at S111), the initial copy program 2221 determines whether S102 is performed for all copy target data (S112). When the result of the determination at S112 is false (NO at S112), the processing returns to S102. When the result of the determination at S112 is true (YES at S112), the processing ends.

As described above, a "chunk" is the unit of data in which the deduplication program 2231 executes deduplication. In the present embodiment, for example, the chunk size is 4 KB. Deduplication is achieved by dividing an area from the leading position of the PVOL 26P into chunks of 4 KB and checking the duplication relation thereof. Duplication of a registered pattern and data stored in the PVOL 26P is removed, and thus the amount of data consumed for pattern storage is reduced. Specifically, capacity consumption can be prevented by dividing the data read at S102 into one or more data chunks and registering each data chunk as a pattern.

When the leading address of the data read at S102 is different from the leading address of a chunk or when the end address of the data read at S102 is different from the end address of a chunk, the initial copy program 2221 sets the leading address of a chunk as the leading address of a pattern to be extracted from the data read at S102.

Figure 9B:
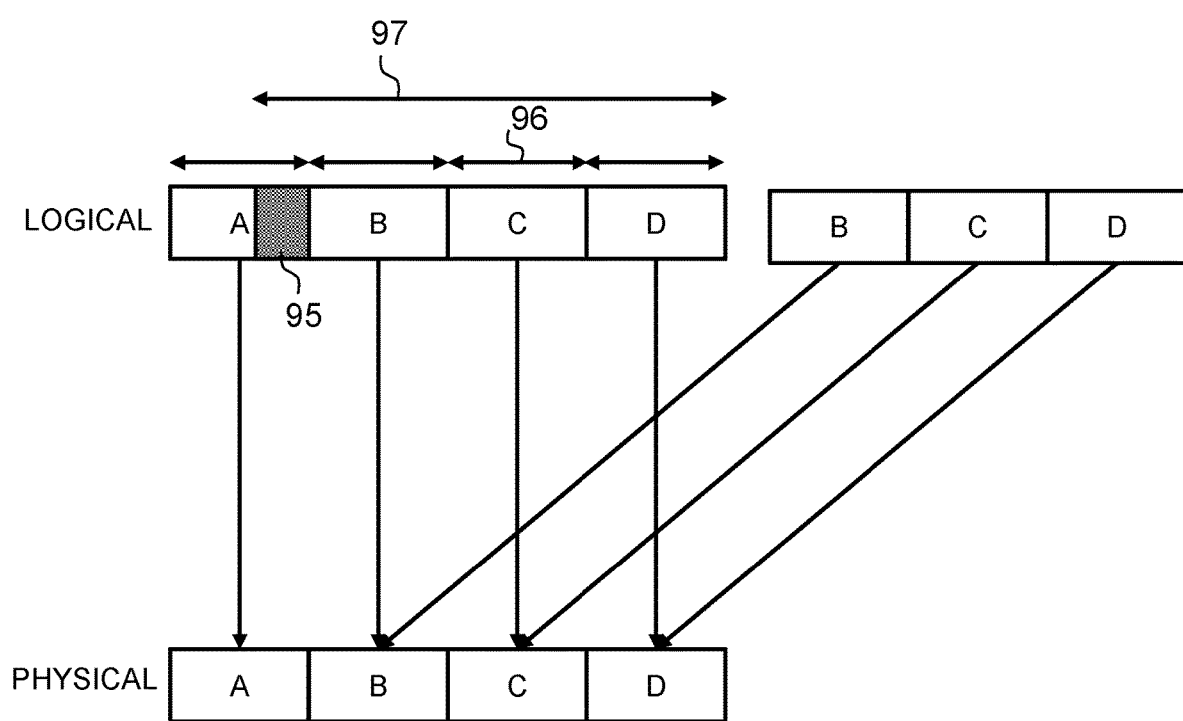
FIG. 9B illustrates exemplary address alignment.

For example, as exemplarily illustrated in FIG. 9B, when the leading address of data 97 read at S102 is different from the leading address of a deduplication unit 96, the initial copy program 2221 may skip S104 and S105 and perform S109 for data 95 from the leading address of the data 97 read at S102 to the leading address of the deduplication unit 96. Specifically, for example, when the unit size of deduplication is 4 KB and the data read at S102 is data of 3 KB to 15 KB with respect to the leading position of the PVOL 26P, duplication of data of 4 KB from 5 KB to 8 KB and data of 4 KB from 9 KB to 12 KB can be removed, and thus S104 and S105 may be executed for the data. However, the unit of data of 2 KB from 3 KB to 4 KB is different from the deduplication unit, and thus S104 and S105 may be skipped and S109 may be executed for the data. The data size of the data body of 3 KB from 13 KB to 15 KB is different from the deduplication unit, and thus S104 and S105 may be skipped and S109 may be performed for the data.

The pattern registration processing at S110 may be performed when pattern registration is normally ended in the secondary storage system 200B as the copy destination. For example, after S109, S110 may be performed when the initial copy program 2221 receives a pattern registration completion report (specifically, notification at S206 in a case of YES at S201 in FIG. 10 to be described later) from the secondary storage system 200B. Accordingly, no pattern registration situation difference occurs between the storage systems 200A and 200B, and it is possible to avoid, for example, occurrence of a situation in which a data chunk of a pattern is forwarded by the primary storage system 200A but the pattern does not exist in the secondary storage system 200B.

FIG. 10 illustrates the process of secondary copy processing performed by the secondary copy program 2222 in the secondary storage system 200B. The processing illustrated in FIG. 10 may be processing common to synchronous remote copy and asynchronous remote copy.

The secondary copy program 2222 receives the fingerprint value forwarded at S108 in FIG. 9A or the copy request associated with a data body and forwarded at S109 in FIG. 9A (S200).

When the copy request received at S200 is associated with a data body (YES at S201), the secondary copy program 2222 stores the data body at an address (logical area in the SVOL 26S) indicated by a copy-destination address included in the copy request (S207). Thereafter, the secondary copy program 2222 causes the pattern registration program 2227 in the secondary storage system 200B to execute the pattern registration processing (S208). Thereafter, the secondary copy program 2222 reports completion of the copy request received at S200 to the secondary storage system 200B (S206). S208 may be omitted so that the primary storage system 200A periodically forwards a registered pattern to the secondary storage system 200B and the secondary storage system 200B registers the forwarded pattern to the pattern VOL 26XS. However, in the present embodiment, the pattern registration processing is performed upon reception of the data body, and thus the amount of forwarded data can be efficiently reduced. Specifically, when a forwarding request for the same data occurs between the secondary copy program 2222 and the pattern synchronization program 2230 (computer program that operates separately from data body forwarding), the data body is forwarded because no pattern is registered. However, since the pattern registration processing is executed along with the data body forwarding, it is possible to avoid unnecessary data body forwarding due to no pattern registration.

When the copy request received at S200 is associated with a fingerprint value (NO at S201), the secondary copy program 2222 searches the pattern management table 2211A for a fingerprint value 601 matching with the fingerprint value (S202). The secondary copy program 2222 determines whether there is the matching fingerprint value 601 as a result of S202 and a validation flag 602 corresponding to the fingerprint value 601 is "ON" (S203).

When the result of the determination at S203 is false (NO at S203), the secondary copy program 2222 requests the primary storage system 200A for forwarding of the data body (S209). When the secondary copy program 2222 receives the data body from the primary storage system 200A in response to the request, S207 and S208 are performed.

When the result of the determination at S203 is true (YES at S203), the secondary copy program 2222 reads a pattern from a logical area (area in the pattern VOL 26XS) indicated by a pattern address 603 corresponding to the matching fingerprint value 601 and stores a data chunk as the pattern in an area (area in the SVOL 26S) indicated by address information associated with the copy request (S205). Thereafter, the secondary copy program 2222 reports completion of the copy request received at S200 to the secondary storage system 200B (S206).

At S205, deduplication may be performed to associate a storage-destination logical area of the data chunk with a physical area in which the data chunk exists.

Pattern reading is potentially impossible due to failure of the pattern VOL 26XS or the like in some cases even when there is the matching fingerprint value 601. In such a case, the result of the determination at S203 is false and S209 may be performed.

Figure 11:
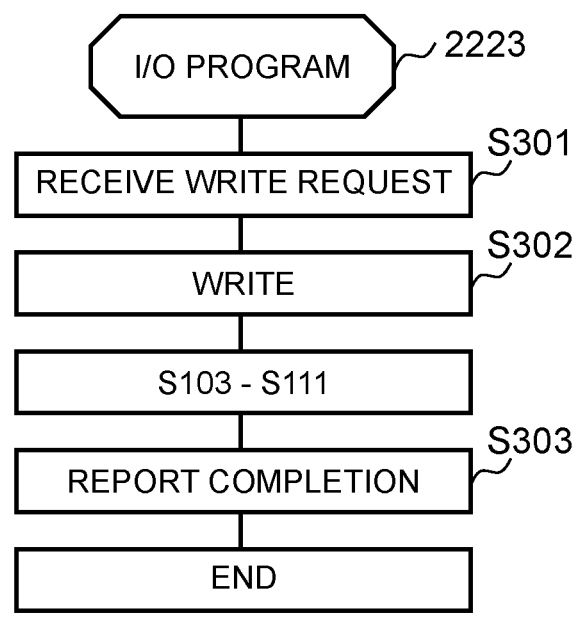
FIG. 11 illustrates the process of write processing performed by an I/O program in the primary storage system.

FIG. 11 illustrates the process of write processing performed by the I/O program 2223 in the primary storage system 200A. The process is executed when synchronous remote copy is employed.

The I/O program 2223 receives a write request with a specified PVOL 26P from, for example, the primary host 100A (S301) and writes data accompanying the write request to the PVOL 26P (S302). Thereafter, the I/O program 2223 executes S103 to S111 in FIG. 9A and reports completion of the write request received at S301 to, for example, the primary host 100A (S303).

Figure 12A:
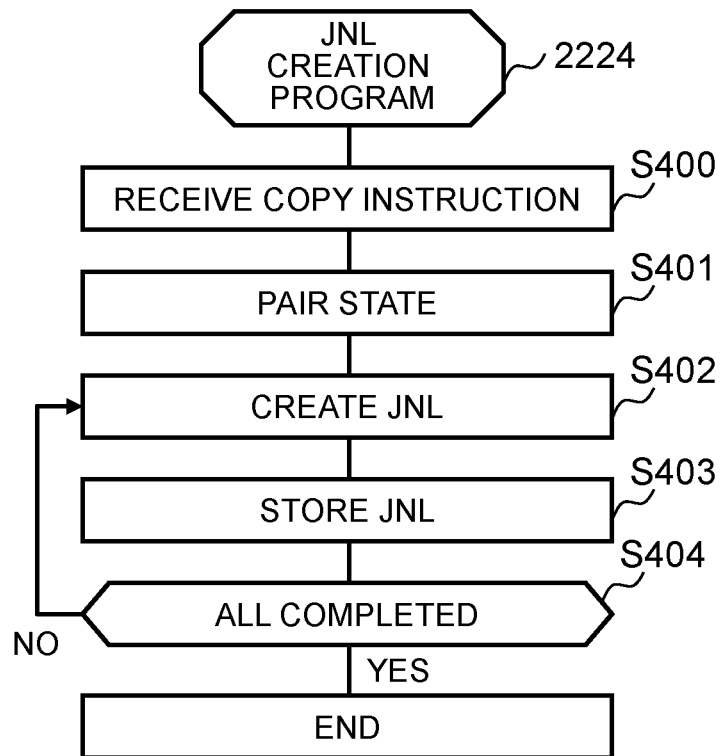
FIG. 12A illustrates the process of JNL creation processing performed by a JNL creation program in the primary storage system.

FIG. 12A illustrates the process of JNL creation processing performed by the JNL creation program 2224 in the primary storage system 200A. The process is executed when asynchronous remote copy is employed.

The JNL creation program 2224 receives a copy instruction for the PVOL 26P (S400) and sets, to the pair table 2213, an entry including a predetermined pair state of the VOL pair of the PVOL 26P and the SVOL 26S, the ID of the PVOL, the ID of the SVOL, and the ID of a copy-destination storage system (S401). The JNL creation program 2224 creates a JNL including data stored in the PVOL 26P (S402) and stores the JNL in a predetermined storage area (for example, a JNL VOL (not illustrated)) (S403). S402 and S403 are performed for all data in the PVOL 26P (S404).

Each time the I/O program 2223 receives a write request that specifies the PVOL 26P, a JNL may be created and stored for data accompanying the write request.

Figure 12B:
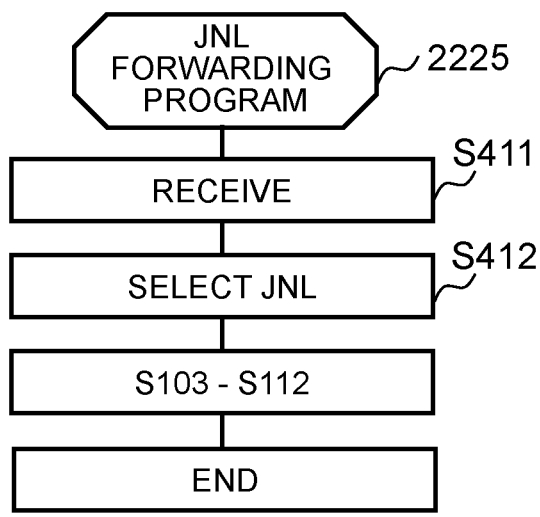
FIG. 12B illustrates the process of JNL forwarding processing performed by a JNL forwarding program in the primary storage system.

FIG. 12B illustrates the process of JNL forwarding processing performed by the JNL forwarding program 2225 in the primary storage system 200A. The process is executed when asynchronous remote copy is employed.

The JNL forwarding program 2225 receives, for example, a JNL forwarding request (JNL read request) from the secondary storage system 200B (S411) and selects a forwarding target JNL (S412). The JNL is selected in accordance with information (for example, a sequence number) indicating a data writing order. After S412, the JNL forwarding program 2225 executes S103 to S112 in FIG. 9A.

Processing performed by the secondary storage system 200B having received the JNL may be the processing illustrated in FIG. 10. The secondary copy program 2222 may temporarily store the received JNL in a predetermined storage area (for example, a JNL VOL (not illustrated)), and thereafter, may write data in the JNL to the SVOL 26S. In this case, the secondary copy program 2222 may execute S201 to S209 in FIG. 10.

Figure 13:
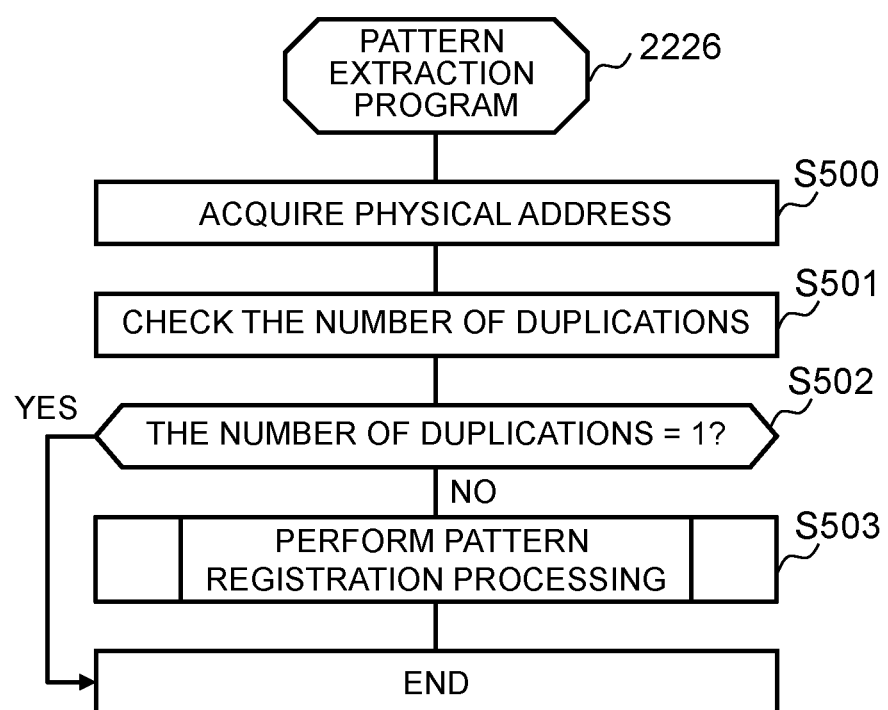
FIG. 13 illustrates the process of pattern extraction processing performed by a pattern extraction program in the primary storage system.

FIG. 13 illustrates the process of pattern extraction processing performed by the pattern extraction program 2226 in the primary storage system 200A. In the process, the pattern registration processing is performed at a timing and by a method that are different from those of pattern extraction in the initial copy processing and the write processing.

The pattern extraction program 2226 acquires a physical address that is the address of a physical area in the physical storage area 80P (S500). The pattern extraction program 2226 checks the number of duplications that is the number of logical areas associated with the physical area indicated by the physical address (S501). For example, the number of duplications may be registered in a table (not illustrated) for each physical address, and the table may be shared among a plurality of computer programs including the deduplication program 2231 so that each computer program can specify the number of duplications for each physical address.

When the number of duplications exceeds one, the pattern extraction program 2226 causes the pattern registration program 2227 to execute the pattern registration processing (S503).

Through the processing illustrated in FIG. 13, a data chunk having a large number of duplications is extracted as a pattern, and the pattern is registered. It is thought that data having a larger number of duplications is highly likely to be forwarded to the secondary storage system a plurality of times. Thus, the condition that the number of duplications exceeds one in the present example may be replaced with any other condition. The pattern synchronization program 2230 may be executed right after S503.

Figure 14:
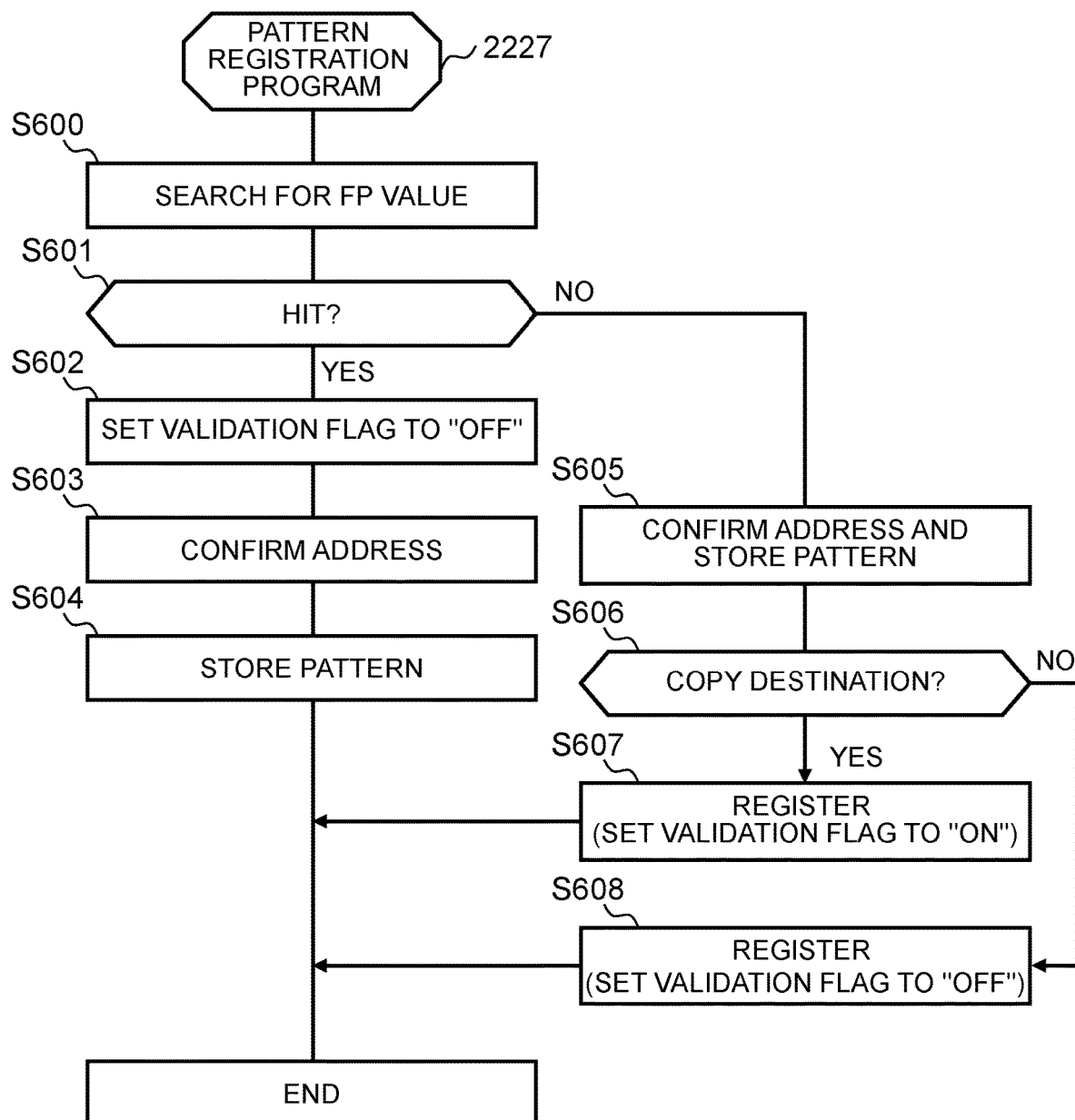
FIG. 14 illustrates the process of pattern registration processing performed by a pattern registration program in the primary storage system.

FIG. 14 illustrates the process of pattern registration processing performed by the pattern registration program 2227 in the primary storage system 200A. The pattern registration processing is performed at, for example, S110 in FIG. 9A, S208 in FIG. 10, or S503 in FIG. 13.

The pattern registration program 2227 searches the pattern management table 2211A for a fingerprint value 601 matching with the fingerprint value of a registration target pattern (data chunk) (S600).

When there is the matching fingerprint value 601 (YES at S601), another data chunk is registered as a pattern with the same fingerprint value. In other words, fingerprint value collision (in which different data chunks have the same fingerprint value) occurs. In this case, the pattern registration program 2227 sets a validation flag 602 corresponding to the matching fingerprint value 601 to "OFF" (in other words, "invalidates" the registered pattern) (S602). The pattern registration program 2227 confirms an address in the pattern VOL 26XP (S603) and stores a registration target pattern in a logical area (area in the pattern VOL 26XP) at the confirmed address (S604). In this process, the pattern registration program 2227 changes, to the address confirmed at S603, an address indicated by the pattern address 603 corresponding to the matching fingerprint value 601. The old pattern may be deleted from the pattern VOL. As a result, the registered pattern is replaced with another pattern. Since the validation flag 602 is set to "OFF" at S602, a data chunk that corresponds to a fingerprint value, collision of which has occurred, and is newly stored in the PVOL 26P is forwarded to the secondary storage system 200B. Accordingly, it is possible to avoid data error that occurs when a new data chunk exists in the primary storage system 200A but is not forwarded and an old data chunk is maintained in the secondary storage system 200B.

In the above description, an old pattern (pattern registered before start of the present processing) is replaced with a new pattern. However, the old pattern may be continuously used without registering a new pattern. In this case, S602, S603, and S604 are skipped. When collision occurs, another identifier may be generated and registered for a new pattern. In this case, the pattern stored with the other identifier needs to be separately searched in the pattern search processing. Alternatively, two patterns may be registered with the same identifier, and a data structure or information with which it can be determined at pattern search that the two patterns are registered may be added.

When there is no matching fingerprint value 601 (NO at S601), the pattern registration program 2227 confirms an address in the pattern VOL 26XP (S605) and stores a registration target pattern in a logical area (area in the pattern VOL 26XP) at the confirmed address (S605). Subsequently, the pattern registration program 2227 determines whether the registration target pattern is registered at a copy destination (the secondary storage system 200B) (S606). For example, when it is reported at S206 that registration of a pattern of the data body is completed and the report is received by the primary storage system 200A, the result of the determination at S606 is true. Deduplication processing is executed by a deduplication function for the pattern stored at S604 or S605 and a data chunk from which the pattern is extracted. The deduplication processing is performed in the chunk unit, and thus, the storage at S604 and S605 is started at the same storage start position in a chunk as data from which the pattern is extracted. In the above description, since processing is performed for a chunk at S103, the pattern can be stored from the leading position of the chunk.

When the result of the determination at S606 is true (YES at S606), the pattern registration program 2227 registers the fingerprint value of the registration target pattern, the validation flag of "ON", and the address confirmed at S605 to the pattern management table 2211A.

When the result of the determination at S606 is false (NO at S606), the pattern registration program 2227 registers the fingerprint value of the registration target pattern, the validation flag of "OFF", and the address confirmed at S605 to the pattern management table 2211A. The validation flag is set to "OFF" to forward a data chunk as the pattern. In other words, the validation flag is set to "OFF" because the pattern does not exist at a copy destination and thus the secondary storage system 200B having received the fingerprint value cannot acquire, from the pattern, a data chunk to be stored in the SVOL 26S. In the pattern storage at S604 and S605, the pattern may be stored in a pattern VOL, and a physical area including the data chunk from which the pattern is extracted may be associated with an area (area in the pattern VOL 26XP) in which the pattern is to be stored.

In some cases, an upper limit for the number of patterns that can be registered is provided to at least one pattern VOL 26X. For example, since a pattern is a data chunk written in a physical area through the PVOL 26P, the pattern itself consumes no capacity, but information such as the fingerprint value, the validation flag, and the pattern address consumes capacity. With such restriction (or another reason) on capacity consumption, an upper limit is provided to the number of patterns that can be registered in some cases.

Figure 16:
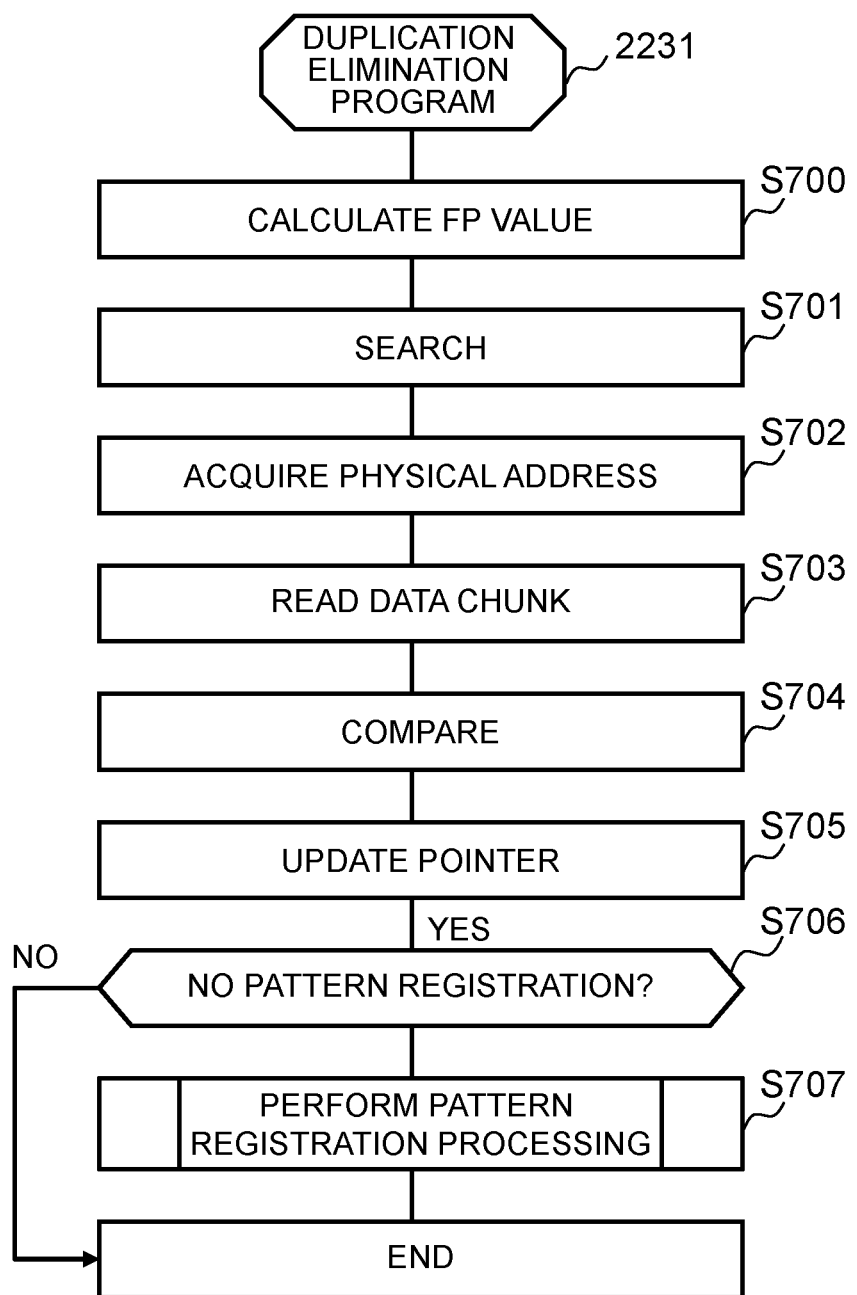
FIG. 16 illustrates the process of deduplication processing performed by a deduplication program.
Figure 17:
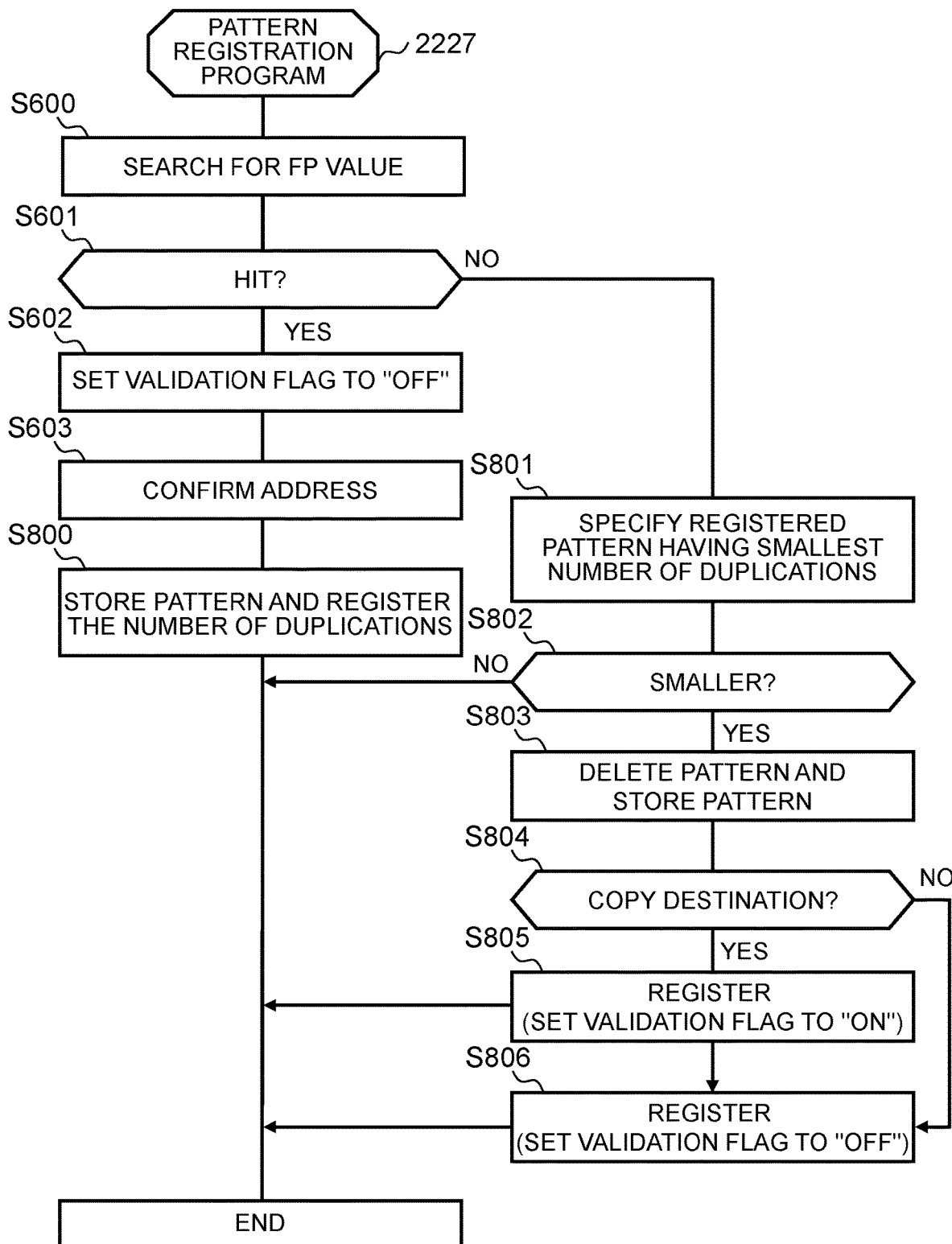
FIG. 17 illustrates the process of pattern registration processing performed by the pattern registration program.

For example, description with reference to FIGS. 15 to 17 is applied to the pattern VOL 26X for which an upper limit is provided to the number of patterns that can be registered.

FIG. 15 illustrates an exemplary configuration of the pattern management table 2211B.

In the present embodiment, there are one or both of the pattern management table 2211A (table corresponding to the pattern VOL 26X for which no upper limit is provided to the number of patterns that can be registered) and the pattern management table 2211B (table corresponding to the pattern VOL 26X for which an upper limit is provided to the number of patterns that can be registered).

The pattern management table 2211B includes, for each pattern, a number 1501 of duplications in addition to the fingerprint value 601, the validation flag 602, and the pattern address 603. For each pattern, the number 1501 of duplications is the number of logical areas associated with a physical area in which a data chunk as the pattern exists. When the number of patterns that can be registered has an upper limit, a forwarding data reduction effect can be increased by preferentially registering, as a pattern, a data chunk having a larger number of duplications. An index other than the number of duplications may be employed. The index may be, for example, a data forwarding avoidance record, a data forwarding avoidance prediction, the amount of physical capacity consumed for pattern storage, an elapsed time period since pattern registration, an elapsed time period since the time of last use (reference) as a pattern, or an I/O frequency (access frequency) of a data chunk as a pattern. One or more of these indexes may be combined as an index.

FIG. 16 illustrates the process of deduplication processing performed by the deduplication program 2231.

The deduplication program 2231 calculates the fingerprint value of a target data chunk (S700) and searches for a data chunk having the same fingerprint value as the calculated fingerprint value (S701). When such a data chunk is found, the deduplication program 2231 acquires the physical address of a physical area in which the data chunk exists (S702) and reads the data chunk from the physical area (S703). The deduplication program 2231 compares the target data chunk with the data chunk read at S703 to check whether the data chunks match with each other (S704). The deduplication program 2231 performs pointer update that associates a chunk in which the target data chunk is stored with the physical area specified at S702 (S705).

When the deduplication program 2231 checks that the target data chunk is not registered as a pattern (NO at S706), the pattern registration program 2227 may execute pattern registration processing (S707).

FIG. 17 illustrates the process of the pattern registration processing performed by the pattern registration program 2227 when the number of patterns that can be registered has an upper limit. The pattern registration processing is performed at, for example, S707 in FIG. 16. Difference from the processing illustrated in FIG. 14 will be mainly described below.

In a case of YES at S601, S800 is performed in place of S604. Specifically, the pattern registration program 2227 stores the registration target pattern in a logical area (area in the pattern VOL 26XP) at the address confirmed at S603 and registers the number 1501 of duplications for a physical area associated with the logical area to the pattern management table 2211B (S800).

In a case of NO at S601, S801 to S806 are performed in place of S605 to S608. Specifically, the pattern registration program 2227 specifies a registered pattern having a smallest number of duplications based on the pattern management table 2211B (S801). The pattern registration program 2227 determines whether the number of duplications specified at S801 is smaller than the number of duplications of the registration target pattern (S802).

When the result of the determination at S802 is true (YES at S802), the registered pattern having a smallest number of duplications is replaced with the registration target pattern. Specifically, the pattern registration program 2227 deletes the registered pattern having a smallest number of duplications from the pattern VOL 26X (S803). A new pattern is stored in an area in which the deleted pattern has been stored. The pattern registration program 2227 determines whether the registration target pattern is registered at a copy destination (the secondary storage system 200B) (S804).

When the result of the determination at S804 is true (YES at S804), the pattern registration program 2227 registers the fingerprint value of the registration target pattern, the number of duplications, the validation flag of "ON", and the address of the pattern deleted at S803 to the pattern management table 2211B (S805).

When the result of the determination at S804 is false (NO at S804), the pattern registration program 2227 registers the fingerprint value of the registration target pattern, the number of duplications, the validation flag of "OFF", and the address of the pattern deleted at S803 to the pattern management table 2211B (S806).

In the example illustrated in FIG. 17, whether the pattern replacement is to be performed is determined based on the magnitude relation in the number of duplications, but whether the pattern replacement is to be performed may be determined based on information other than the number of duplications, in place of or in addition to the number of duplications. For example, a registered pattern to be replaced with the registration target pattern (in other words, a deletion target registered pattern) may be determined based on at least one of a data forwarding avoidance record, a data forwarding avoidance prediction, the amount of physical capacity consumed for pattern storage, an elapsed time period since pattern registration, an elapsed time period since the time of last use (reference) as a pattern, and an I/O frequency (access frequency) of a data chunk as a pattern. Accordingly, it is expected to preferentially register a registered pattern that contributes to reduction of the amount of forwarded data.

After NO at S601, S801 may be performed when the number of registered patterns has reached an upper limit. Specifically, the processing exemplarily illustrated in FIG. 14 may be executed when the number of registered patterns has not reached the upper limit.

Figure 18:
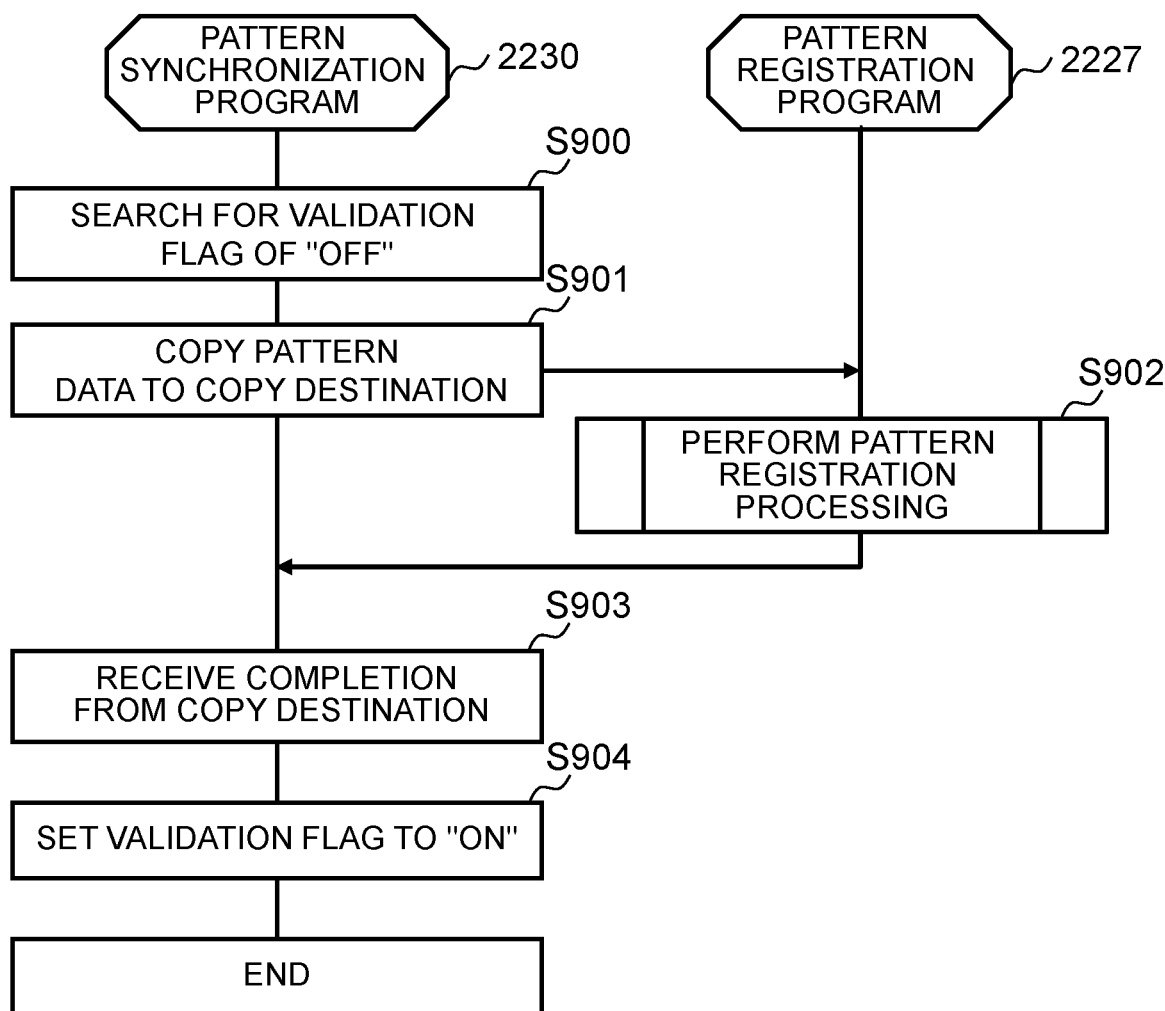
FIG. 18 illustrates the process of pattern registration-synchronization processing performed by a pattern synchronization program in the primary storage system and a pattern registration program in the secondary storage system.

FIG. 18 illustrates the process of pattern registration-synchronization processing performed by the pattern synchronization program 2230, the secondary storage system 200B, and the pattern registration program 2227 in the primary storage system 200A.

The pattern synchronization program 2230 searches for the validation flag 602 of "OFF" (S900) and forwards a pattern corresponding to the found validation flag 602 of "OFF" to the secondary storage system 200B (S901). In the secondary storage system 200B, the pattern registration program 2227 executes pattern registration processing (S902). For example, the pattern registration processing illustrated in FIG. 14 is executed. The pattern registration program 2227 in the secondary storage system 200B reports completion of the pattern registration processing illustrated in FIG. 14 to the primary storage system 200A.

The pattern synchronization program 2230 receives the report of completion of the pattern registration processing from the secondary storage system 200B (S903) and sets the validation flag 602 found at S900 to "ON" (S904).

At S902, the validation flag 602 of "ON" may be registered in the secondary storage system 200B. Alternatively, the validation flag 602 of "OFF" may be registered at S902, but the validation flag 602 of "ON" may be notified from the primary storage system 200A to the secondary storage system 200B at S904, and the validation flag 602 may be changed from "OFF" to "ON" in the secondary storage system 200B having received the notification.

The processing illustrated in FIG. 18 may be performed for a pattern of a fingerprint value when the pattern synchronization program 2230 has received the fingerprint value as a parameter.

Figure 19:
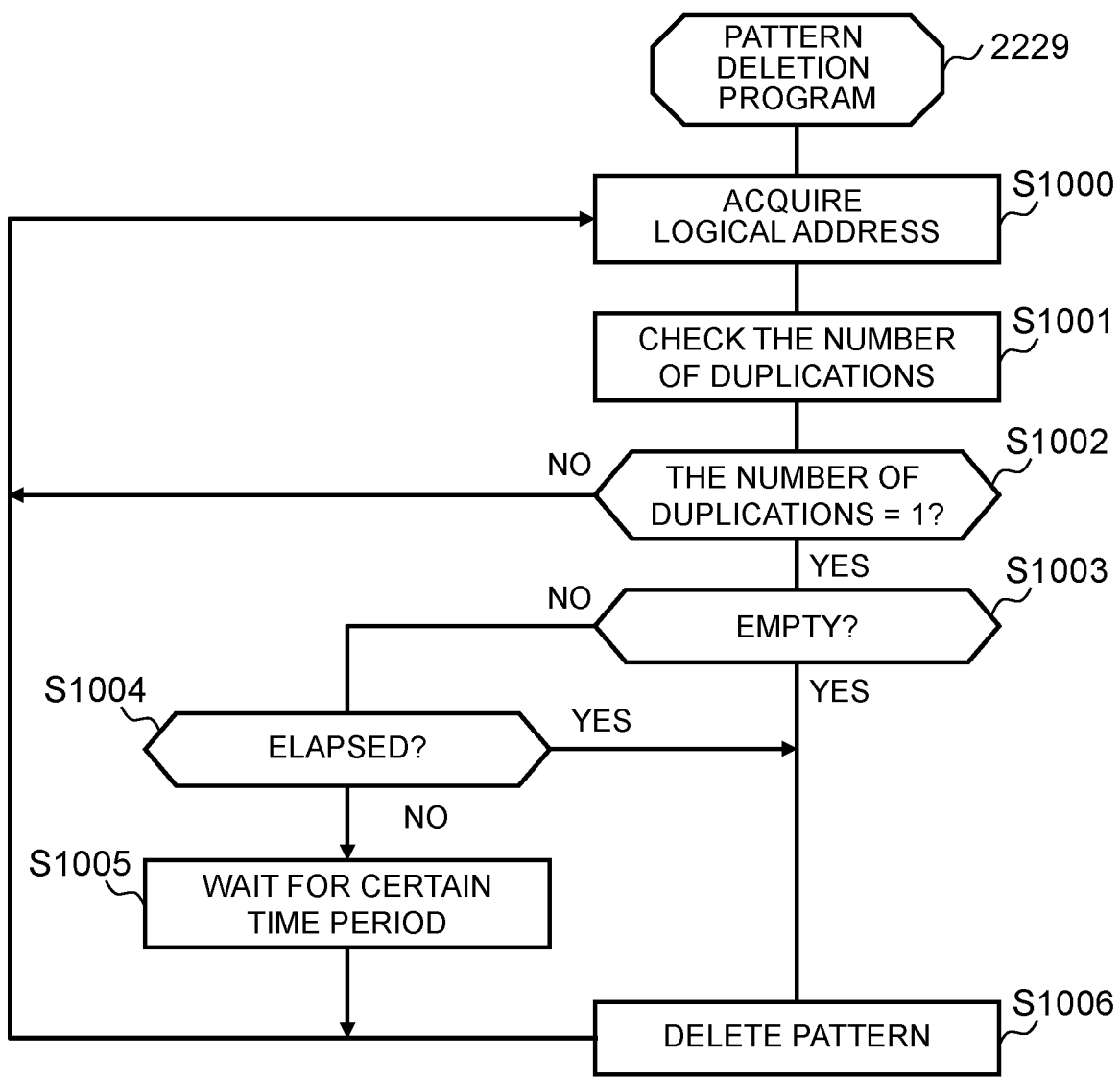
FIG. 19 illustrates the process of pattern deletion processing performed by a pattern deletion program in the primary storage system (or the secondary storage system)

FIG. 19 illustrates the process of pattern deletion processing performed by the pattern deletion program 2229 in the primary storage system 200A (or the secondary storage system 200B).

The pattern deletion program 2229 acquires a logical address (pattern address indicated by the pattern management table 2211A) in the pattern VOL 26X (S1000) and checks the number of duplications of a pattern corresponding to the acquired logical address (S1001).

When the number of duplications is one (exemplary predetermined number of duplications) (YES at S1002), the pattern deletion program 2229 determines whether the capacity of the physical storage area 80P (or 80S) is empty (its available capacity is equal to or less than certain capacity) (S1003).

When the result of the determination at S1003 is true (YES at S1003), the pattern deletion program 2229 deletes the pattern corresponding to the logical address acquired at S1000 (and a record corresponding to the pattern in the pattern management table) (S1006).

When the result of the determination at S1003 is false (NO at S1003), the pattern deletion program 2229 determines whether a predetermined time period has elapsed since registration (or last use) of the pattern corresponding to the logical address acquired at S1000 (S1004). When the result of the determination at S1004 is true (YES at S1004), S1006 may be executed. When the result of the determination at S1004 is false (NO at S1004), S1000 may be executed for the same or another logical address after elapse of a certain time period.

The pattern deletion may be performed when at least one of S1002, S1003, and S1004 is satisfied or when one or more conditions are satisfied for the pattern in place of or in addition to at least one of S1002, S1003, and S1004.

In this manner, the pattern deletion can be efficiently performed, and accordingly, the capacity of the pattern management table 2211A or 2211B can be appropriately reduced. For example, the condition that the number of registered patterns duplications is one means that a logical area associated with a physical area in which a data chunk as the pattern exists is only a logical area in the pattern VOL 26X. In this case, the data chunk is not to be forwarded through the PVOL 26P, and thus the pattern is preferably deleted.

Second Embodiment

A second embodiment will be described below. The description will be mainly made on difference from the first embodiment, and description of any feature common to that of the first embodiment will be omitted or simplified.

Figure 20A:
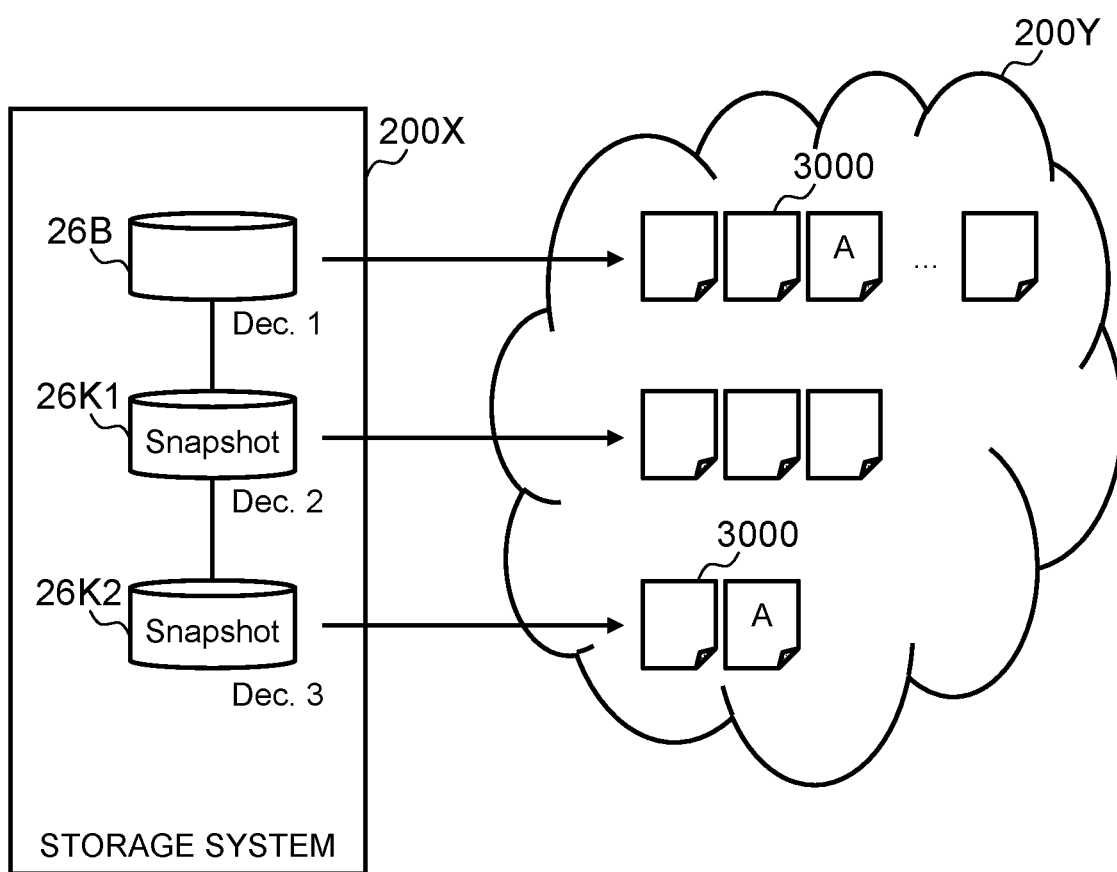
FIG. 20A illustrates an overview of an exemplary case in which snapshot data backup is performed in a second embodiment.

FIG. 20A illustrates an overview of an exemplary case in which snapshot data backup is performed.

A storage system 200X is an exemplary backup-source storage system. The configuration of the storage system 200X may be the same as that of the above-described storage system 200A or 200B. The storage system 200X acquires a snapshot VOL 26K that is a snapshot of a VOL 26B (exemplary target VOL).

Data in the snapshot VOL 26K is referred to as "snapshot data". The snapshot data includes data as a difference between the snapshot VOL 26K and its comparison reference VOL in place of or in addition to data in a comparison reference (previous) VOL (for example, the initial VOL 26B or the previous (for example, latest) snapshot VOL 26K) of the snapshot VOL 26K. The data as the difference may be managed in the chunk unit (deduplication unit) or in a unit smaller or larger than the chunk unit. The difference is data for which snapshot data is different from the comparison reference VOL. For example, when writing occurs to a snapshot, written data is managed as the difference. In addition, when the volume 26B is updated after snapshot creation, data before the update is managed as differential data.

The kind of a backup-destination storage system is not limited, but in the present embodiment, the backup-destination storage system is an object storage system 200Y. The object storage system 200Y may be an object storage service of a public cloud or may be an object storage product that provides an object storage interface. The storage product may be installed at another data center or at the same data center as that of the storage system 200X. When an object is associated with one file, the present technology is also applicable to a network attached storage (NAS) configuration that is a file storage. According to the present embodiment, snapshot data is backed up to the object storage system 200Y. FIG. 20A illustrates an example in which a snapshot is acquired once a day and data is backed up to the object storage system 200Y as follows.

The storage system 200X stores, as a data object in the object storage system 200Y, data stored in the base VOL 26B on December 1. Typically, it is assumed that the number of VOLs and the number of objects have the ratio of 1:N (N is an integer equal to or larger than one), and thus a plurality of data objects 3000 are illustrated in FIG. 20A. However, the number of VOLs and the number of objects may have the ratio of 1:1.

A snapshot VOL 26K1 on December 2 holds only differential data generated between December 1 and December 2. Only this differential data is stored in the object storage system 200Y.

A snapshot VOL 26K2 on December 3 holds only differential data generated between December 2 and December 3. Only this differential data is stored in the object storage system 200Y.

The frequency of snapshot acquisition is once a day in the above-described example, but the frequency of data forwarding to the object storage system 200Y may be the same as or different from the frequency of snapshot acquisition. For example, a part detected as a part that is no longer referred in snapshot data may be forwarded to the object storage system 200Y.

In this manner, not all data in the snapshot VOL 26K but only differential data is forwarding target data, and thus the amount of forwarded data can be reduced.

According to the present embodiment, when differential data A on December 3 is a forwarding target, the storage system 200X can detect that the differential data A is the same as differential data A forwarded to the object storage system 200Y in the past, and can avoid forwarding of the differential data A to the object storage system 200Y again. Thus, the amount of forwarded data can be further reduced.

Figure 20B:
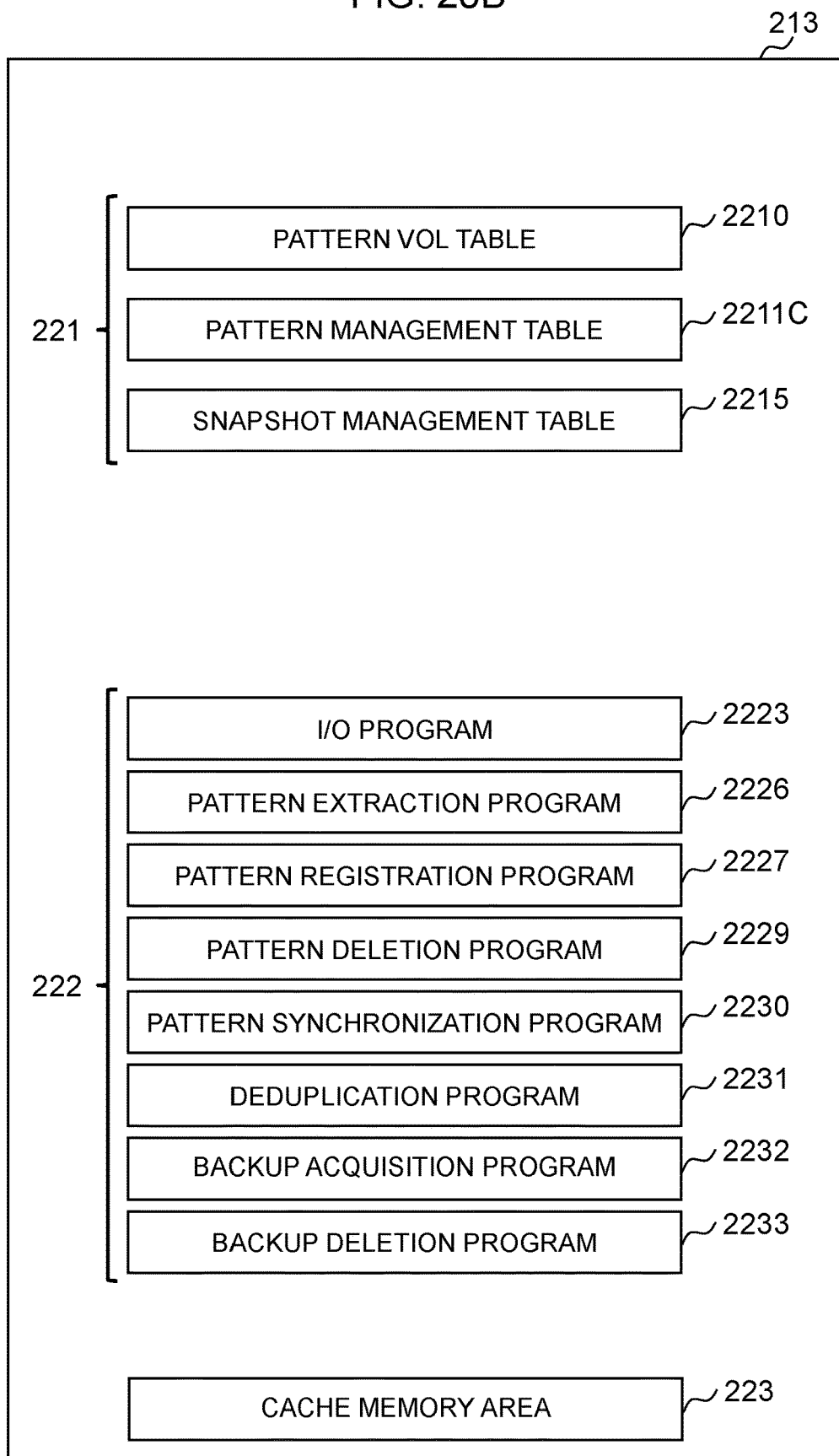
FIG. 20B illustrates an exemplary configuration of the memory of the storage system.

FIG. 20B illustrates an exemplary configuration of the memory 213 of the storage system 200X.

The management information in the management area 221 includes the pattern VOL table 2210, a pattern management table 2211C, and a snapshot management table 2215.

Computer programs stored in the computer program area 222 are, for example, the I/O program 2223, the pattern extraction program 2226, the pattern registration program 2227, the pattern deletion program 2229, the pattern synchronization program 2230, and the deduplication program 2231 as well as a backup acquisition program 2232 for acquiring a backup, and a backup deletion program 2233 for deleting a backup.

FIG. 21 illustrates an exemplary configuration of the snapshot management table 2215.

The snapshot management table 2215 is a table that manages, for each snapshot, data forwarded to an object storage. Specifically, a table for achieving a typical snapshot function in the storage system 200X is omitted. Such a table is, for example, a table for managing the storage position of data of a snapshot 26K1. The table manages, for each chunk of the snapshot 26K1, the storage address of differential data and the address of the volume 26B from which the snapshot is obtained. The snapshot management table 2215 includes, for each acquired snapshot, information such as a snapshot acquisition time 2101, a chunk number 2102, and an object key 2103. When the timing of snapshot creation is different from the timing of forwarding to the object storage, the snapshot management table 2215 may manage the situation of forwarding to the object storage. The managed situation is such that, for example, forwarding is completed, yet to be performed, or in execution.

The snapshot acquisition time 2101 indicates a time at which a snapshot is acquired. The chunk number 2102 indicates the identification number of a data chunk as a data object. The object key 2103 is a key (identification information) for access to the data object. One or more chunk numbers and object keys are managed for a snapshot. A chunk number may be any information with which a chunk can be specified, and may be address information or the like.

In the example illustrated in FIG. 21, the number of data chunks (deduplication units) and the number of data objects have the ratio of 1:1, but may have the ratio of 1:N (N is an integer equal to or larger than one) or M:1 (M is an integer equal to or larger than one).

Figure 22:
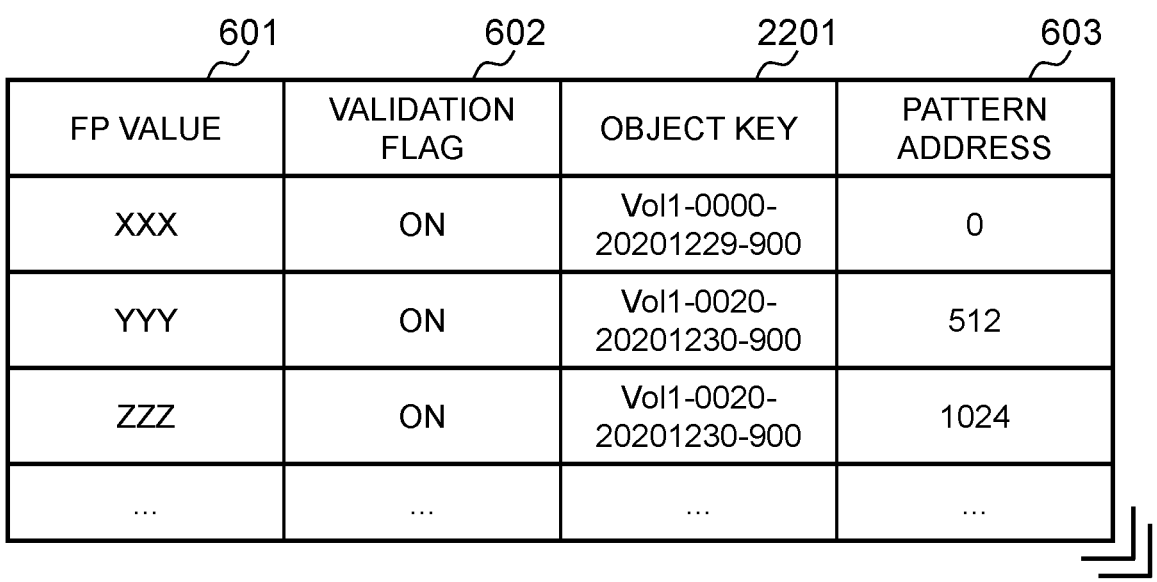
FIG. 22 illustrates an exemplary configuration of a third pattern management table.

FIG. 22 illustrates an exemplary configuration of the pattern management table 2211C.

The pattern management table 2211A includes, for each pattern, the fingerprint value 601, the validation flag 602, and the pattern address 603 as well as an object key 2201. Specifically, in the present embodiment, a forwarding target data chunk is stored as a data object in the object storage system 200Y, and a pattern as a data chunk is associated with an object key for a data object as the data chunk.

Figure 23:
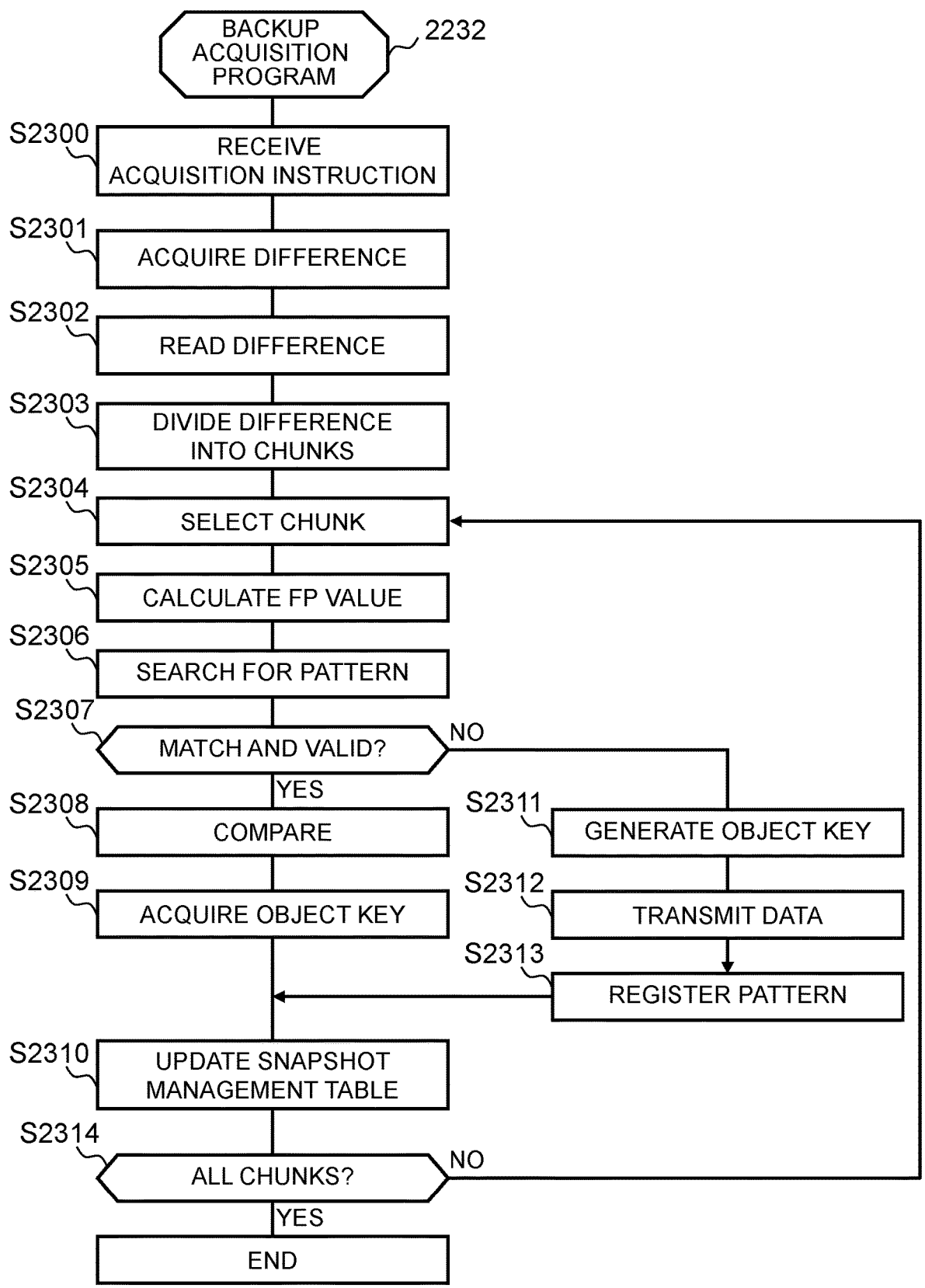
FIG. 23 illustrates the process of backup acquisition processing performed by a backup acquisition program.

FIG. 23 illustrates the process of backup acquisition processing performed by the backup acquisition program 2232.

The backup acquisition program 2232 receives an instruction of snapshot forwarding to an object storage (S2300). The instruction specifies a target snapshot. Differential data of the specified snapshot VOL 26K from a comparison reference VOL (latest snapshot) is specified (S2301). The backup acquisition program 2232 divides the specified differential data into data chunks (S2303). In the present program, a created snapshot is specified. However, the present program may create a new snapshot and forward the difference between the new snapshot and the comparison reference VOL.

The backup acquisition program 2232 selects one data chunk yet to be selected among the one or more data chunks obtained at S2303 (S2304) and calculates the fingerprint value of the selected data chunk (S2305). The backup acquisition program 2232 searches the pattern management table 2211C for a fingerprint value 601 matching with the fingerprint value calculated at S2305 (S2306). The backup acquisition program 2232 determines whether there is the matching fingerprint value 601 as a result S2306 and a validation flag 602 corresponding to the fingerprint value 601 is "ON" (S2307).

When the result of the determination at S2307 is false (NO at S2307), the backup acquisition program 2232 generates an object key of the data chunk selected at S2304 (S2311) and forwards (stores) the data chunk to the object storage system 200Y (S2312). The backup acquisition program 2232 registers a pattern as the data chunk to the pattern VOL 26X (S2313). In this process, the backup acquisition program 2232 registers the fingerprint value calculated at S2305, the validation flag of "ON", the object key generated at S2311, and the pattern address of a registration-destination area of the pattern to the pattern management table 2211C. Subsequently, the backup acquisition program 2232 updates the snapshot management table (S2310). The chunk number of the chunk forwarded to the object storage and the object key generated at S2311 are stored.

When the result of the determination at S2307 is true (YES at S2307), the backup acquisition program 2232 reads a pattern from a logical area (area in the pattern VOL 26X) indicated by the pattern address 603 corresponding to the matching fingerprint value 601 and checks that the pattern matches with the data chunk selected at S2304 through comparison (S2308).

Thereafter, the backup acquisition program 2232 acquires an object key 2201 corresponding to the matching fingerprint value 601 (S2309) and registers the object key (and the chunk number of the data chunk selected at S2304) to the snapshot management table 2215 in association with the time of current snapshot acquisition (S2310). In other words, when the result of the determination at S2307 is true, the backup acquisition program 2232 acquires an object key from the pattern management table 2211C and stores the object key in the snapshot management table. Accordingly, without forwarding a data chunk as at least part of differential data, it can be regarded that the data chunk is forwarded to the object storage system 200Y.

After S2310, the backup acquisition program 2232 determines whether all of the one or more data chunks obtained at S2303 are selected at S2304 (S2314). When the result of the determination at S2314 is false (NO at S2314), the processing returns to S2304.

FIG. 24 illustrates the process of backup deletion processing performed by the backup deletion program 2233.

The backup deletion program 2233 receives a snapshot deletion instruction (S2400) and specifies, in the snapshot management table 2215, all data objects (all object keys) corresponding to the acquisition time of a snapshot specified by the instruction (S2401).

The backup deletion program 2233 selects one data object yet to be selected among the data objects specified at S2401 (S2402). The backup deletion program 2233 determines whether the data object selected at S2302 is referred by another snapshot VOL (snapshot VOL other than a deletion target snapshot VOL) (S2403).

When the result of the determination at S2403 is false (NO at S2403), the backup deletion program 2233 transmits an object deletion instruction that specifies the object key of the data object to the object storage system 200Y. In response to the instruction, a data object specified based on the specified object key is deleted from the object storage system 200Y.

Accordingly, a data object that is not referred by any other snapshot can be deleted from the object storage system 200Y.

When the result of the determination at S2403 is true (YES at S2403) or after S2404, the backup deletion program 2233 determines whether all data objects specified at S2401 are each selected at S2402 (S2405). When the result of the determination at S2405 is false (NO at S2405), the processing returns to S2402.

When the result of the determination at S2405 is true (YES at S2405), the backup deletion program 2233 deletes a snapshot VOL 26K corresponding to the acquisition time of the snapshot specified by the instruction received at S2400 (S2406).

As described above in each embodiment, a backup-source storage system (storage system 200A or 200X) extracts, as a pattern, forwarding target data to a backup-destination storage system (storage system 200B or 200Y). The backup-source storage system determines whether the extracted pattern of the forwarding target data is registered in the backup-source storage system irrespective of a storage destination logical address (for example, a logical address in the PVOL 26P) of the forwarding target data in the backup-source storage system. When the result of the determination is false, the backup-source storage system registers the extracted pattern to the backup-source storage system and forwards the forwarding target data to the backup-destination storage system. When the result of the determination is true, the backup-source storage system does not forward the forwarding target data.

The above-described embodiments are examples for description of the present invention and are not intended to limit the scope of the present invention. The present invention may be achieved in other various kinds of embodiments.

We claim:

1. A backup system, comprising a backup-source storage system, which is configured to communicate with a backup-destination storage system and which includes a primary volume and a first storage apparatus; and the backup-destination storage system, wherein the backup-destination storage system includes a secondary volume, and a second storage apparatus to which data is written through the secondary volume, wherein the backup-destination storage system is configured to specify, based on identification information from the backup-source storage system, a pattern managed in the backup-destination storage system, wherein the backup-source storage system is configured to manage, for each registered pattern in the backup-source storage system, identification information of the registered pattern, wherein (A) the backup-source storage system extracts, as a pattern, forwarding target data to the backup-destination storage system, wherein (B) the backup-source storage system determines, without sending the extracted pattern of the forwarding target data to the back-up destination storage, whether the extracted pattern of the forwarding target data is registered in the backup-source storage system irrespective of a logical address of a storage-destination area of the forwarding target data in the backup-source storage system, wherein (C) when a result of the determination in (B) is false, the backup-source storage system registers the extracted pattern to the backup-source storage system and forwards the forwarding target data to the backup-destination storage system, and the backup-destination storage system receives the forwarding target data, stores the received data in the secondary volume and registers the received data to the backup-destination storage system as the pattern, and associates a storage address of the forwarding target data stored in the secondary volume with the registration destination of the pattern, and wherein (D) when the result of the determination in (B) is true, the backup-source storage system does not forward the forwarding target data and forwards, to the backup-destination storage system, identification information of a registered pattern for which the result of the determination in (B) is true.

2. The backup system according to claim 1, wherein the backup-source storage system is cloud storage.

3. The backup system according to claim 1, wherein the backup-source storage system is SDS (Software Defined Storage).

4. The backup system according to claim 1, wherein the backup-source storage system is object storage.

5. The backup system according to claim 1, wherein the backup-source storage system creates a snapshot of the primary volume.

6. The backup system according to claim 5, wherein the backup-source storage system specifies a difference from the snapshot as differential data, and the forwarding target data is the differential data.

7. The backup system according to claim 6, wherein the backup-source storage system divides the differential data into multiple data chunks by a transfer size, and the forwarding target data is each of the data chunks.

8. The backup system according to claim 1, wherein the backup- source storage system calculates a fingerprint value of the forwarding target data.

9. The backup system according to claim 8, wherein the backup source storage system performs a pattern search based on the fingerprint value to determine whether there is a matching fingerprint value.

10. The backup system according to claim 9, wherein the backup-destination storage system is object storage, and the backup source storage system acquires an object key corresponding to the matching fingerprint value when the result of the determination of the matching fingerprint value is true.

11. The backup system according to claim 10, wherein the backup source storage system stores the object key.

12. The backup system according to claim 9, wherein when the result of the determination of the matching fingerprint value is false, the backup source storage system generates an object key and transfers the divided differential data to an object storage as the second storage.

13. The backup system according to claim 10, wherein the backup source storage system performs the pattern search with respect to data of a pattern management table that includes, for each pattern, the fingerprint value, a validation flag, a pattern address and the object key.

14. The backup system according to claim 9, wherein the backup source storage system performs the pattern search with respect to data of a pattern management table.

15. The backup system according to claim 10, wherein the backup source storage system performs deletion processing with respect to data of a pattern management table that includes the object key such that the object key specified for deletion is deleted to the object storage as the back-up source storage.

16. The backup system according to claim 1, wherein the backup-source storage system includes a logical storage area that is a pattern registration destination, wherein the association of the registration of the extracted pattern with the logical area as a registration destination of the extracted pattern in the logical storage area with the physical area in which the forwarding target data exists is in the first storage apparatus, and a registered pattern in the logical storage area is data existing in the physical area associated with a logical area as a registration destination of the pattern.

17. The backup system according to claim 16, wherein the backup-source storage system performs deduplication that associates two or more logical areas to which the same data is written among a plurality of logical areas included in the volume and each having a predetermined size, with one physical area to which the data is written, and aligns an address of the forwarding target data and an address of a logical area and extracts, as a pattern, data in each size of the logical area.

18. The backup system according to claim 16, wherein the backup-source storage system stores pattern management information that is management information related to a pattern, the pattern management information indicates, for each registered pattern in the logical storage area, an address of the logical area as the registration destination of the pattern and whether the data as the registered pattern exists in the backup-destination storage system or is valid or invalid, and the determination in (B) is determination of whether the extracted pattern matches with a registered pattern and determination of whether the registered pattern matching with the extracted pattern is valid.

19. The backup system according to claim 1, wherein the registration of the extracted pattern in (C) is association of a logical area as a registration destination of the extracted pattern with a physical area in which the forwarding target data exists in the first storage apparatus,
in (A), the backup-source storage system extracts the forwarding target data as a pattern when the number of duplications of the forwarding target data is larger than a predetermined threshold value,
when data having write destinations in two or more different logical areas in the backup-source storage system is duplicate, the backup-source storage system performs deduplication that associates the two or more logical areas with a physical area in which the data exists, and
the number of duplications of the forwarding target data is the number of logical areas associated with a physical area in which the data exists.

20. The backup system according to claim 1, wherein a physical area in which the forwarding target data exists in the first storage apparatus is associated with one or more logical areas that are write destinations of the data or registration destinations of a pattern of the data, and
when there is a physical area associated with a registration-destination logical area of a registered pattern but not associated with a write-destination logical area of data, the backup-source storage system deletes a registered pattern as data existing in the physical area.

21. The backup system according to claim 1, wherein a physical area in which the forwarding target data exists in the first storage apparatus is associated with one or more logical areas that are write destinations of the data or registration destinations of a pattern as the data,
the number of patterns that can be registered to the backup-source storage system has an upper limit, and
the backup-source storage system determines a deletion target registered pattern based on at least one of items listed below, and deletes the determined registered pattern:
the number of duplications that is the number of logical areas associated with a physical area in which data as the registered pattern is stored;
an elapsed time period since registration of the registered pattern;
an elapsed time period since last use of the registered pattern; and
a frequency of access to the data as the registered pattern.

22. The backup system according to claim 1, wherein the backup-source storage system manages, for each registered pattern, whether data as the registered pattern exists in the backup-destination storage system or is valid or invalid,
when a valid registered pattern is updated but data as the updated registered pattern is not forwarded to the backup-destination storage system, the backup-source storage system invalidates the registered pattern, and
the backup-source storage system forwards the invalid registered pattern to the backup-destination storage system.

23. The backup system according to claim 1, wherein the volume is a target snapshot volume that is any of one or a plurality of snapshot volumes that are each a snapshot of a specified volume, and
the forwarding target data is data as a difference between the target snapshot volume and a comparison reference volume.

24. The backup system according to claim 23, wherein the backup-destination storage system is an object storage system,
the backup-source storage system manages, for each registered pattern, an object key that is a key for access to a data object as the registered pattern,
in (C), the backup-source storage system generates an object key of the forwarding target data, associates the generated object key with a logical area corresponding to the forwarding target data in the target snapshot volume, and forwards the forwarding target data to the backup-destination storage system, and
in (D), the backup-source storage system associates an object key of a registered pattern for which the result of the determination in (B) is true with the logical area corresponding to the forwarding target data in the target snapshot volume.

25. The backup system according to claim 1, wherein, in (C), the backup-source storage system performs the registration of the extracted pattern when a pattern as the forwarding target data is registered to the backup-destination storage system.

26. A backup-source storage system, which is configured to communicate with a backup-destination storage system and which includes a primary volume and a first storage apparatus;
wherein the backup-destination storage system includes a secondary volume and a second storage apparatus to which data is written through the secondary volume,
wherein the backup-destination storage system is configured to specify, based on identification information from the backup-source storage system, a pattern managed in the backup-destination storage system,
wherein the backup-source storage system is configured to manage, for each registered pattern in the backup-source storage system, identification information of the registered pattern,
wherein (A) the backup-source storage system extracts, as a pattern, forwarding target data to the backup-destination storage system,
wherein (B) the backup-source storage system determines, without sending the extracted pattern of the forwarding target data to the back-up destination storage, whether the extracted pattern of the forwarding target data is registered in the backup-source storage system irrespective of a logical address of a storage-destination area of the forwarding target data in the backup-source storage system,
wherein (C) when a result of the determination in (B) is false, the backup-source storage system registers the extracted pattern to the backup-source storage system and forwards the forwarding target data to the backup-destination storage system, and
the backup-destination storage system receives the forwarding target data, stores the received data in the secondary volume and registers the received data to the backup-destination storage system as the pattern, and
wherein (D) when the result of the determination in (B) is true, the backup-source storage system does not forward the forwarding target data and forwards, to the backup-destination storage system, identification information of a registered pattern for which the result of the determination in (B) is true.

27. A backup method of a backup system, including a backup-source storage system, which is configured to communicate with a backup-destination storage system and which includes a primary volume and a first storage apparatus; and the backup-destination storage system, the method comprising:

including, by the backup-destination storage system, a secondary volume, and a second storage apparatus to which data is written through the secondary volume, specifying, by the backup-destination storage system, based on identification information from the backup-source storage system, a pattern managed in the backup-destination storage system, managing, by the backup-source storage system, for each registered pattern in the backup-source storage system, identification information of the registered pattern, (A) extracting, by the backup-source storage system, as a pattern, forwarding target data forwarded to the backup-destination storage system, (B) determining, by the backup-source storage system, without sending the extracted pattern of the forwarding target data to the back-up destination storage, whether the extracted pattern of the forwarding target data is registered in the backup-source storage system irrespective of a logical address of a storage-destination area of the forwarding target data in the backup-source storage system, (C) when a result of the determination in (B) is false, registering, by the backup-source storage system, the extracted pattern to the backup-source storage system and forwarding the forwarding target data to the backup-destination storage system, and receiving, by the backup-destination storage system, the forwarding target data, storing the received data in the secondary volume and registering the received data to the backup-destination storage system as the pattern, and associating a storage address of the forwarding target data stored in the secondary volume with the registration destination of the pattern, and (D) when the result of the determination in (B) is true, not forwarding, by the backup-source storage system, the forwarding target data, and forwarding to the backup-destination storage system identification information of a registered pattern for which the result of the determination in (B) is true.

28. A method of backup with a backup-source storage system, which is configured to communicate with a backup-destination storage system and which includes a primary volume and a first storage apparatus, the method comprising:

including, by the backup-destination storage system, a secondary volume and a second storage apparatus to which data is written through the secondary volume, specifying, by the backup-destination storage system, based on identification information from the backup-source storage system, a pattern managed in the backup-destination storage system, managing, by the backup-source storage system, for each registered pattern in the backup-source storage system, identification information of the registered pattern, (A) extracting, by the backup-source storage system, as a pattern, forwarding target data forwarded to the backup-destination storage system, (B) determining, by the backup-source storage system, without sending the extracted pattern of the forwarding target data to the back-up destination storage, whether the extracted pattern of the forwarding target data is registered in the backup-source storage system irrespective of a logical address of a storage-destination area of the forwarding target data in the backup-source storage system, (C) when a result of the determination in (B) is false, registering, by the backup-source storage system, the extracted pattern to the backup-source storage system and forwarding the forwarding target data to the backup-destination storage system, and receiving, by the backup-destination storage system, the forwarding target data, storing the received data in the secondary volume and registering the received data to the backup-destination storage system as the pattern, and (D) when the result of the determination in (B) is true, not forwarding, by the backup-source storage system, the forwarding target data and forwarding, to the backup-destination storage system, identification information of a registered pattern for which the result of the determination in (B) is true.

* * * * *